US011691106B2

(12) United States Patent
Peter et al.

(10) Patent No.: US 11,691,106 B2
(45) Date of Patent: Jul. 4, 2023

(54) SELECTIVE CATALYTIC REDUCTION CATALYST ON A FILTER SUBSTRATE

(71) Applicant: BASF CORPORATION, Florham Park, NJ (US)

(72) Inventors: Matthias Peter, Hannover (DE); Susanne Stiebels, Hannover (DE); Karifala Dumbuya, Hannover (DE); Claudia Zabel, Hannover (DE)

(73) Assignee: BASF Corporation, Florham Park, NJ (US)

( * ) Notice: Subject to any disclaimer, the term of this patent is extended or adjusted under 35 U.S.C. 154(b) by 236 days.

(21) Appl. No.: 17/309,016

(22) PCT Filed: Oct. 30, 2019

(86) PCT No.: PCT/EP2019/079607
§ 371 (c)(1),
(2) Date: Apr. 14, 2021

(87) PCT Pub. No.: WO2020/089275
PCT Pub. Date: May 7, 2020

(65) Prior Publication Data
US 2021/0379530 A1    Dec. 9, 2021

(30) Foreign Application Priority Data

Oct. 30, 2018    (EP) .................... 18203398

(51) Int. Cl.
*B01D 53/94* (2006.01)
*B01J 21/06* (2006.01)
(Continued)

(52) U.S. Cl.
CPC ........ *B01D 53/9418* (2013.01); *B01J 21/066* (2013.01); *B01J 21/12* (2013.01);
(Continued)

(58) Field of Classification Search
CPC combination set(s) only.
See application file for complete search history.

(56) References Cited

U.S. PATENT DOCUMENTS

| 2011/0123421 | A1* | 5/2011 | Gru ........................ F01N 3/035 422/177 |
| 2015/0098870 | A1 | 4/2015 | Lambert et al. |

(Continued)

FOREIGN PATENT DOCUMENTS

| EP | 0393905 A2 | 10/1990 |
| WO | 2017/178576 A1 | 10/2017 |
| WO | 2018/025245 A1 | 2/2018 |

OTHER PUBLICATIONS

International Search Report dated Feb. 5, 2020 for International Application No. PCT/EP2019/079607.

*Primary Examiner* — Binh Q Tran
(74) *Attorney, Agent, or Firm* — DLA Piper LLP (US)

(57) ABSTRACT

A selective catalytic reduction catalyst for the treatment of an exhaust gas stream of a passive ignition engine, the catalyst comprising a porous wall-flow filter substrate comprising an inlet end, an outlet end, a substrate axial length (w) extending between the inlet end and the outlet end, and a plurality of passages defined by porous internal walls of the porous wall flow filter substrate; wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material; wherein the catalyst further comprises a second coating, the second coating extending over y % of the substrate axial length from the outlet end toward the inlet end of the substrate, y being in the range of from 20 to 90, wherein the second coating comprises copper, and optionally an 8-mem- (Continued)

bered ring pore zeolitic material; wherein the catalyst optionally further comprises a third coating; wherein x+y is at least 90; wherein y % of w from the outlet end toward the inlet end of the substrate define the outlet zone of the coated substrate and (100−y) % of w from the inlet end toward the outlet end of the substrate define the inlet zone of the coated substrate; wherein the ratio of the loading of copper in the inlet zone, Cu(in), calculated as CuO, relative to the loading of copper in the outlet zone, Cu(out), calculated as CuO, Cu(in):Cu(out), is less than 1:1.

20 Claims, 5 Drawing Sheets

(51) Int. Cl.
| | |
|---|---|
| *B01J 21/12* | (2006.01) |
| *B01J 21/18* | (2006.01) |
| *B01J 29/76* | (2006.01) |
| *B01J 35/00* | (2006.01) |
| *B01J 35/02* | (2006.01) |
| *B01J 35/04* | (2006.01) |
| *B01J 35/10* | (2006.01) |
| *B01J 37/02* | (2006.01) |
| *B01J 37/04* | (2006.01) |
| *B01J 37/08* | (2006.01) |
| *F01N 3/021* | (2006.01) |
| *F01N 3/10* | (2006.01) |
| *F01N 3/20* | (2006.01) |
| *F01N 3/28* | (2006.01) |
| *F01N 3/08* | (2006.01) |

(52) U.S. Cl.
CPC ............ *B01J 21/18* (2013.01); *B01J 29/763* (2013.01); *B01J 35/0006* (2013.01); *B01J 35/023* (2013.01); *B01J 35/04* (2013.01); *B01J 35/1019* (2013.01); *B01J 35/1023* (2013.01); *B01J 35/1076* (2013.01); *B01J 37/0228* (2013.01); *B01J 37/04* (2013.01); *B01J 37/082* (2013.01); *F01N 3/021* (2013.01); *F01N 3/106* (2013.01); *F01N 3/2066* (2013.01); *F01N 3/28* (2013.01); *B01D 2255/20761* (2013.01); *B01D 2255/50* (2013.01); *B01D 2255/9032* (2013.01); *B01D 2255/9035* (2013.01); *B01D 2255/911* (2013.01); *B01D 2255/9155* (2013.01); *B01D 2255/9207* (2013.01); *F01N 3/0814* (2013.01); *F01N 3/0871* (2013.01); *F01N 2330/30* (2013.01); *F01N 2370/04* (2013.01); *F01N 2370/24* (2013.01); *F01N 2510/0682* (2013.01); *F01N 2510/0684* (2013.01)

(56) References Cited

U.S. PATENT DOCUMENTS

| | | | |
|---|---|---|---|
| 2016/0045868 A1* | 2/2016 | Sonntag | B01J 37/0246 422/171 |
| 2018/0043305 A1* | 2/2018 | Voss | B01D 53/9477 |
| 2018/0266290 A1* | 9/2018 | Burgess | F01N 3/2828 |
| 2018/0296979 A1* | 10/2018 | Tsuji | F01N 3/103 |
| 2019/0022584 A1* | 1/2019 | Hilgendorff | B01J 29/763 |
| 2019/0105650 A1* | 4/2019 | Welsch | B01J 35/0006 |
| 2019/0170042 A1* | 6/2019 | Xue | B01J 37/0246 |

* cited by examiner

SELECTIVE CATALYTIC REDUCTION CATALYST ON A FILTER SUBSTRATE

This application is a national stage filing under 35 U.S.C. § 371 of International Application No. PCT/EP2019/079607, filed on Oct. 30, 2019, which claims priority to European Patent Application No. 18203398.5, filed on Oct. 30, 2018; the contents of each application is incorporated herein by reference in its entirety.

The present invention relates to a selective catalytic reduction catalyst for the treatment of an exhaust gas stream of a passive ignition engine, and a process for preparing said catalyst. The present invention further relates to an exhaust gas treatment system comprising said selective catalytic reduction catalyst and to uses of said selective catalytic reduction catalyst and of said exhaust gas treatment system.

US 2015/0098870 A1 discloses a selective catalytic reduction catalyst comprising two catalytic layers, a first layer comprising a beta zeolite comprising copper and a second layer comprising a chabazite zeolite comprising copper. WO 2017/178576 A1 discloses a selective catalytic reduction catalyst on a filter comprising a first upstream zone comprising a chabazite molecular sieve and a second downstream zone comprising a levine molecular sieve comprising copper. US 2018/0296979 A1 discloses an exhaust gas purification material comprising an inlet coating comprising a Fe-containing beta zeolite and an outlet coating comprising a Fe-containing beta zeolite and a copper containing SAPO. However, there is still a need to provide selective catalytic reduction catalysts which exhibit improved NOx conversions in a wide temperature window, namely from 150 to 650° C.

Therefore, it was an object of the present invention to provide a selective catalytic reduction catalyst for the treatment of an exhaust gas stream of a passive ignition engine which exhibits improved NOx conversions in a wide temperature window, namely from 150 to 650° C.

Therefore, the present relates to a selective catalytic reduction catalyst for the treatment of an exhaust gas stream of a passive ignition engine, the catalyst comprising
a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material;
wherein the catalyst further comprises a second coating, the second coating extending over y % of the substrate axial length from the outlet end toward the inlet end of the substrate, y being in the range of from 20 to 90, wherein the second coating comprises copper, and optionally an 8-membered ring pore zeolitic material;
wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate;
wherein the ratio of the loading of copper in the inlet zone, Cu(in), calculated as CuO, relative to the loading of copper in the outlet zone, Cu(out), calculated as CuO, Cu(in):Cu(out), is less than 1.1.

It is preferred that x is in the range of from 20 to 80 and that y is in the range of from 20 to 80.

It is preferred that x is in the range of from 55 to 80, more preferably in the range of from 60 to 75.

It is preferred that y is in the range of from 20 to 45, more preferably in the range of from 25 to 40. It is more preferred that x is in the range of from 55 to 80, more preferably in the range of from 60 to 75, and that y is in the range of from 20 to 45, more preferably in the range of from 25 to 40.

It is preferred that x is in the range of from 20 to 45, more preferably in the range of from 25 to 40.

It is preferred that y is in the range of from 55 to 80, more preferably in the range of from 60 to 75. It is more preferred that x is in the range of from 20 to 45, more preferably in the range of from 25 to 40 and that y is in the range of from 55 to 80, more preferably in the range of from 60 to 75.

It is preferred that x is in the range of from 40 to 60, more preferably in the range of from 45 to 55.

It is preferred that y is in the range of from 40 to 60, more preferably in the range of from 45 to 55. It is more preferred that x is in the range of from 40 to 60, more preferably in the range of from 45 to 55 and that y is in the range of from 40 to 60, more preferably in the range of from 45 to 55.

It is preferred that x+y is in the range of from 95 to 100, more preferably in the range of from 98 to 100.

It is preferred that there is a gap between the first coating and the second coating, wherein the gap extends over g % of the substrate axial length, g being at most 10, more preferably in the range of from 0.2 to 5, more preferably in the range of from 0.5 to 2, wherein x+y+g=100. It is more preferred that the gap is at least partially within the interior of the filter substrate.

Alternatively, it is preferred that x+y=100, wherein there is no gap between the first coating and the second coating.

As a further alternative, it is preferred that x is in the range of from 95 to 100 and that y is in the range of from 20 to 50, more preferably in the range of from 25 to 40.

It is preferred that x+y>100, more preferably 100<x+y≤150. It is more preferred that x is in the range of from 95 to 100, that y is in the range of from 20 to 50, more preferably in the range of from 25 to 40 and that x+y>100, more preferably 100<x+y≤150.

It is preferred that there is an overlap of the first coating and the second coating over q % of the substrate axial length, q being at most 50, more preferably in the range of from 10 to 45, more preferably in the range of from 20 to 40, wherein x+y−q=100. It is more preferred that the overlap is at least partially within the interior of the filter substrate.

As to the zeolitic material contained in the first coating, it is preferred that it has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX a mixture of two or more thereof and a mixed type of two or more thereof, more preferably selected from the group consisting of CHA and AEI. It is more preferred that the zeolitic material contained in the first coating has a framework type CHA.

Preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1.

It is preferred that at most 1 weight-%, more preferably from 0 to 0.5 weight-%, more preferably from 0 to 0.1 weight-%, of the framework structure of the zeolitic material contained in the first coating consist of P.

It is preferred that the zeolitic material comprised in the first coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the first coating comprises the zeolitic material at a loading in the range of from 0.1 to 3 $g/in^3$, more preferably in the range of from 0.2 to 2.5 $g/in^3$, more preferably in the range of from 0.7 to 2.25 $g/in^3$.

It is preferred that the first coating further comprises an oxidic material, wherein the oxidic material more preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia. It is more preferred that the first coating comprises the oxidic material at a loading in the range of from 0.01 to 0.2 $g/in^3$, more preferably in the range of from 0.03 to 0.1 $g/in^3$.

It is preferred that the first coating further comprises a non-zeolitic oxidic material, wherein the non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica. It is more preferred that from 95 to 100 weight-%, more preferably from 98 to 100 weight-%, more preferably from 99 to 100 weight-%, more preferably 99.5 to 100 weight-% of the non-zeolitic oxidic material consist of alumina and silica. It is more preferred that the weight ratio of alumina to silica is in the range of from 10:1 to 20:1, more preferably in the range of from 12:1 to 18:1.

Therefore, the present invention preferably relates to a selective catalytic reduction catalyst for the treatment of an exhaust gas stream of a passive ignition engine, the catalyst comprising a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material, wherein the zeolitic material has a framework type CHA and wherein the first coating more preferably further comprises a non-zeolitic oxidic material, wherein the non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica;
wherein the catalyst further comprises a second coating, the second coating extending over y % of the substrate axial length from the outlet end toward the inlet end of the substrate, y being in the range of from 20 to 90, wherein the second coating comprises copper, and optionally an 8-membered ring pore zeolitic material;
wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate;
wherein the ratio of the loading of copper in the inlet zone, Cu(in), calculated as CuO, relative to the loading of copper in the outlet zone, Cu(out), calculated as CuO, Cu(in):Cu(out), is less than 1.1.

In the context of the present invention, it is preferred that the first coating comprises the non-zeolitic oxidic material at a loading in the range of from 0.08 to 0.8 $g/in^3$, more preferably in the range of from 0.09 to 0.3 $g/in^3$.

It is preferred that the first coating comprises the zeolitic material at a loading (I1)/($g/in^3$) and the non-zeolitic oxidic material at a loading (I2)/($g/in^3$), wherein the ratio of (I1) to (I2), (I1):(I2), is in the range of from 2:1 to 18:1, more preferably in the range of from 4:1 to 16:1, more preferably in the range of from 5:1 to 15:1, more preferably in the range of from 8:1 to 14:1.

The first coating preferably comprises copper in an amount, calculated as CuO, being in the range of from 0.5 to 7 weight-%, more preferably in the range of from 1 to 6 weight-%, more preferably in the range of from 2.5 to 4.5 weight-%, more preferably in the range of from 2.5 to 3.75 weight-%, based on the weight of the zeolitic material of the first coating.

It is preferred that the zeolitic material of the first coating comprises copper, wherein more preferably from 75 to 100 weight-%, more preferably from 80 to 100 weight-% of the copper comprised in the first coating is comprised in said zeolitic material.

It is preferred that the catalyst comprises the first coating at loading in the range of from 0.1 to 4 $g/in^3$, more preferably in the range of from 0.2 to 3 $g/in^3$, more preferably in the range of from 0.5 to 2.5 $g/in^3$.

Preferably from 98 to 100 weight-%, more preferably from 99 to 100 weight-%, more preferably from 99.5 to 100 weight-% of the first coating consist of the zeolitic material, copper, calculated as CuO, a non-zeolitic oxidic material as defined in the foregoing, and more preferably an oxidic material as defined in the foregoing.

It is preferred that from 30 to 100 weight-%, more preferably from 40 to 100 weight-%, more preferably from 50 to 100 weight-%, more preferably from 80 to 100 weight-% of the first coating are in the pores of the internal walls.

It is preferred that the first coating is disposed on the surface of the internal walls in the inlet passages.

It is preferred that from 0 to 0.01 weight-%, more preferably from 0 to 0.001 weight-%, more preferably from 0 to 0.0001 weight-% of the first coating consist of manganese, more preferably of manganese, cobalt and nickel.

It is preferred that from 0 to 0.01 weight-%, more preferably from 0 to 0.001 weight-%, more preferably from 0 to 0.0001 weight-% of the first coating consist of palladium, more preferably of palladium, platinum and rhodium, more preferably of palladium, platinum, rhodium, osmium and iridium, more preferably of noble metals.

It is preferred that the second coating comprises an 8-membered ring pore zeolitic material, wherein the zeolitic material has more preferably a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX a mixture of two or more thereof and a mixed type of two or more thereof, more preferably selected from the group consisting of CHA and AEI. It is more preferred that the zeolitic material contained in the second coating has a framework type CHA.

Preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1.

It is preferred that at most 1 weight-%, more preferably from 0 to 0.5 weight-%, more preferably from 0 to 0.1 weight-%, of the framework structure of the zeolitic material consist of P It is preferred that the zeolitic material comprised in the second coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the second coating comprises the zeolitic material at a loading in the range of from 0.1 to 3 $g/in^3$, more preferably in the range of from 0.2 to 2.5 $g/in^3$, more preferably in the range of from 0.7 to 2.25 $g/in^3$.

It is preferred that the second coating further comprises an oxidic material, wherein the oxidic material more preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia. It is more preferred that the second coating comprises the oxidic material at a loading in the range of from 0.01 to 0.2 $g/in^3$, more preferably in the range of from 0.03 to 0.1 $g/in^3$.

The second coating preferably further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica. It is more preferred that from 95 to 100 weight-%, more preferably from 98 to 100 weight-%, more preferably from 99 to 100 weight-%, more preferably 99.5 to 100 weight-% of the non-zeolitic oxidic material of the second coating consist of alumina and silica. It is more preferred that the weight ratio of alumina to silica is in the range of from 10:1 to 20:1, more preferably in the range of from 12:1 to 18:1.

Therefore, the present invention preferably relates to a selective catalytic reduction catalyst for the treatment of an exhaust gas stream of a passive ignition engine, the catalyst comprising a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material, wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica;

wherein the catalyst further comprises a second coating, the second coating extending over y % of the substrate axial length from the outlet end toward the inlet end of the substrate, y being in the range of from 20 to 90, wherein the second coating comprises copper, and an 8-membered ring pore zeolitic material, wherein the zeolitic material has a framework type CHA and wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica;

wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;

wherein x+y is at least 90;

wherein y % of w from the outlet end toward the inlet end of the substrate define the outlet zone of the coated substrate and (100−y) % of w from the inlet end toward the outlet end of the substrate define the inlet zone of the coated substrate;

wherein the ratio of the loading of copper in the inlet zone, Cu(in), calculated as CuO, relative to the loading of copper in the outlet zone, Cu(out), calculated as CuO, Cu(in):Cu (out), is less than 1.1.

In the context of the present invention, it is preferred that the second coating comprises the non-zeolitic oxidic material at a loading in the range of from 0.08 to 0.8 $g/in^3$, more preferably in the range of from 0.09 to 0.3 $g/in^3$.

It is preferred that the second coating comprises the zeolitic material at a loading (I1')/(g/in$^3$) and the non-zeolitic oxidic material at a loading (I2')/(g/in$^3$), wherein the ratio of (I1') to (I2'), (I1'):(I2'), is in the range of from 2:1 to 18:1, more preferably in the range of from 4:1 to 16:1, more preferably in the range of from 5:1 to 15:1, more preferably in the range of from 8:1 to 14:1.

It is preferred that the second coating comprises copper in an amount, calculated as CuO, being in the range of from 2.5 to 15 weight-%, more preferably in the range of from 3 to 10 weight-%, more preferably in the range of from 3.5 to 6 weight-%, based on the weight of the zeolitic material of the second coating.

It is preferred that the zeolitic material of the second coating comprises copper, wherein more preferably from 75 to 100 weight-%, more preferably from 80 to 100 weight-% of the copper comprised in the second coating is comprised in said zeolitic material.

The selective catalytic reduction catalyst preferably comprises the second coating at a loading in the range of from 0.1 to 4 g/in$^3$, more preferably in the range of from 0.2 to 3 g/in$^3$, more preferably in the range of from 0.5 to 2.5 g/in$^3$.

Preferably from 98 to 100 weight-%, more preferably from 99 to 100 weight-%, more preferably from 99.5 to 100 weight-% of the second coating consist of the zeolitic material, copper, calculated as CuO, a non-zeolitic oxidic material as defined in the foregoing, and more preferably an oxidic material as defined in the foregoing.

As to the second coating, it is alternatively preferred that from 98 to 100 weight-%, more preferably from 99 to 100 weight-%, more preferably from 99.5 to 100 weight-% of the second coating consist of CuO.

It is preferred that the catalyst comprises the second coating at a loading in the range of from 0.01 to 1 g/in$^3$, more preferably in the range of from 0.01 to 0.5 g/in$^3$, more preferably in the range of from 0.015 to 0.3 g/in$^3$.

Therefore, according to said alternative, the present invention preferably relates to a selective catalytic reduction catalyst for the treatment of an exhaust gas stream of a passive ignition engine, the catalyst comprising
a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material, wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica;
wherein the catalyst further comprises a second coating, the second coating extending over y % of the substrate axial length from the outlet end toward the inlet end of the substrate, y being in the range of from 20 to 90, wherein the second coating comprises copper, wherein from 98 to 100 weight-%, more preferably from 99 to 100 weight-%, more preferably from 99.5 to 100 weight-% of the second coating consist of CuO;
wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate;
wherein the ratio of the loading of copper in the inlet zone, Cu(in), calculated as CuO, relative to the loading of copper in the outlet zone, Cu(out), calculated as CuO, Cu(in):Cu(out), is less than 1:1.

In the context of the present invention, as to the second coating, it is preferred as a further alternative that the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica. It is more preferred that from 95 to 100 weight-%, more preferably from 98 to 100 weight-%, more preferably from 99 to 100 weight-%, more preferably from 99.5 to 100 weight-% of the non-zeolitic oxidic material of the second coating consist of alumina and silica. It is more preferred that the weight ratio of alumina to silica is in the range of from 10:1 to 20:1, more preferably in the range of from 12:1 to 18:1.

It is preferred that the weight ratio of the non-zeolitic oxidic material of the second coating to copper comprised in the second coating is in the range of from 0.1:1 to 5:1, more preferably in the range of from 1:1 to 4:1, more preferably in the range of from 2:1 to 4:1, more preferably in the range of from 2.5:1 to 3.5:1.

It is preferred that the catalyst comprises the second coating at a loading in the range of from 0.01 to 1 g/in$^3$, more preferably in the range of from 0.01 to 0.5 g/in$^3$, more preferably in the range of from 0.015 to 0.3 g/in$^3$.

Preferably from 98 to 100 weight-%, more preferably from 99 to 100 weight-%, more preferably from 99.5 to 100 weight-% of the second coating consist of CuO and the non-zeolitic material as defined in the foregoing.

It is preferred according to the above-mentioned alternative that from 0 to 0.001 weight-%, more preferably from 0 to 0.0001 weight-%, more preferably from 0 to 0.00001 weight-% of the second coating consist of a zeolitic material.

Therefore, according to said alternative, the present invention preferably relates to a selective catalytic reduction catalyst for the treatment of an exhaust gas stream of a passive ignition engine, the catalyst comprising
a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material, wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica;
wherein the catalyst further comprises a second coating, the second coating extending over y % of the substrate axial length from the outlet end toward the inlet end of the substrate, y being in the range of from 20 to 90, wherein the second coating comprises copper, wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica;
wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate; wherein the ratio of the loading of copper in the inlet zone, Cu(in), calculated as CuO, relative to the loading of copper in the outlet zone, Cu(out), calculated as CuO, Cu(in):Cu(out), is less than 1.1.

In the context of the present invention with respect to the second coating, it is preferred that from 30 to 100 weight-%, more preferably from 50 to 100 weight-%, more preferably from 70 to 100 weight-%, more preferably from 80 to 100 weight-% of the second coating are in the pores of the internal walls.

In the context of the present invention with respect to the second coating, it is preferred that the second coating is disposed on the surface of the internal walls in the outlet passages.

In the context of the present invention with respect to the second coating, preferably from 0 to 0.01 weight-%, more preferably from 0 to 0.001 weight-%, more preferably from 0 to 0.0001 weight-% of the second coating consist of consist of manganese, more preferably of manganese, cobalt and nickel.

In the context of the present invention with respect to the second coating, preferably from 0 to 0.01 weight-%, more preferably from 0 to 0.001 weight-%, more preferably from 0 to 0.0001 weight-% of the second coating consist of palladium, more preferably of palladium, platinum and rhodium, more preferably of palladium, platinum, rhodium, osmium and iridium, more preferably of noble metals.

It is preferred that from 98 to 100 weight-%, more preferably from 99 to 100 weight-%, more preferably from 99.5 to 100 weight-% of the selective catalytic reduction catalyst of the present invention consist of the porous wall-flow filter substrate, the first coating and the second coating.

According to a first aspect of the present invention, it is preferred that the selective catalytic reduction catalyst of the present invention comprises the first coating and the second coating,
wherein the first coating comprises copper and an 8-membered ring pore zeolitic material,
wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica,
wherein the second coating comprises copper, and an 8-membered ring pore zeolitic material,
wherein the zeolitic material has a framework type CHA and wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica;
wherein x+y=100;
wherein x is in the range of from 40 to 60, more preferably in the range of from 45 to 55; or
wherein x is in the range of from 55 to 80, more preferably in the range of from 60 to 75; or
wherein x is in the range of from 20 to 45, more preferably in the range of from 25 to 40.

According to a second aspect of the present invention, it is preferred that the selective catalytic reduction catalyst of the present invention comprises the first coating and the second coating,
wherein the first coating comprises copper and an 8-membered ring pore zeolitic material,
wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica,
wherein the second coating comprises copper, wherein from 98 to 100 weight-%, more preferably from 99 to 100 weight-%, more preferably from 99.5 to 100 weight-% of the second coating consist of CuO;
wherein x+y>100, more preferably 100<x+y≤150;
wherein x is in the range of from 95 to 100, more preferably in the range of from 98 to 100, and y is in the range of from 20 to 50, more preferably in the range of from 25 to 40.

According to a third aspect of the present invention, it is preferred that the selective catalytic reduction catalyst of the present invention comprises the first coating and the second coating,
wherein the first coating comprises copper and an 8-membered ring pore zeolitic material,
wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica,
wherein the second coating comprises copper, wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica;
wherein x+y>100, more preferably 100<x+y≤150;
wherein x is in the range of from 95 to 100, more preferably in the range of from 98 to 100, and y is in the range of from 20 to 50, more preferably in the range of from 25 to 40.

Alternatively, in the context of the present invention, it is preferred that the catalyst further comprises the third coating, wherein the third coating extends over z % of the substrate axial length from the inlet end toward the outlet end or from the outlet end toward the inlet end of the substrate.

It is more preferred that the third coating is disposed under the first coating and/or the second coating when present in the pores of the porous internal walls, more preferably under the first coating and the second coating when present in the pores of the porous internal walls.

It is preferred that z is in the range of from 98 to 100, more preferably in the range of from 99 to 100.

It is preferred that the zeolitic material of the third coating has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material of the third coating has a framework type CHA.

Preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1.

It is preferred that at most 1 weight-%, more preferably from 0 to 0.5 weight-%, more preferably from 0 to 0.1 weight-%, of the framework structure of the zeolitic material consist of P.

It is preferred that the zeolitic material comprised in the third coating, more preferably having a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the third coating comprises the zeolitic material at a loading in the range of from 0.1 to 3 $g/in^3$, more preferably in the range of from 0.3 to 1 $g/in^3$.

The third coating further comprises an oxidic material, wherein the oxidic material more preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia. It is more preferred that the third coating comprises the oxidic material at a loading in the range of from 0.01 to 0.4 $g/in^3$, more preferably in the range of from 0.02 to 0.1 $g/in^3$.

It is preferred that the third coating further comprises a non-zeolitic oxidic material, wherein the non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica. It is more preferred that from 95 to 100 weight-%, more preferably from 98 to 100 weight-%, more preferably from 99 to 100 weight-%, more preferably 99.5 to 100 weight-% of the non-zeolitic oxidic material of the third coating consist of alumina and silica. It is more preferred that the weight ratio of alumina to silica is in the range of from 10:1 to 20:1, more preferably in the range of from 12:1 to 18:1.

Therefore, the present invention preferably relates to a selective catalytic reduction catalyst for the treatment of an exhaust gas stream of a passive ignition engine, the catalyst comprising a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material, wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica;
wherein the catalyst further comprises a second coating, the second coating extending over y % of the substrate axial length from the outlet end toward the inlet end of the substrate, y being in the range of from 20 to 90, wherein the second coating comprises copper,
  wherein the second coating further comprises an 8-membered ring pore zeolitic material, wherein the zeolitic material has a framework type CHA and wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica; or
  wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica; or wherein from 98 to 100 weight-%, more preferably from 99 to 100 weight-%, more preferably from 99.5 to 100 weight-% of the second coating consist of CuO;
wherein the catalyst further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material, wherein the zeolitic material has a framework type CHA and wherein the third coating further comprises a non-zeolitic oxidic material, wherein the non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate;
wherein the ratio of the loading of copper in the inlet zone, Cu(in), calculated as CuO, relative to the loading of copper in the outlet zone, Cu(out), calculated as CuO, Cu(in):Cu(out), is less than 1:1. It is more preferred that the second coating further comprises an 8-membered ring pore zeolitic material, wherein the zeolitic material has a framework type CHA and wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica.

In the context of the present invention, it is preferred that the third coating comprises the non-zeolitic oxidic material at a loading in the range of from 0.02 to 0.8 g/in$^3$, more preferably in the range of from 0.04 to 0.2 g/in$^3$.

It is preferred that the third coating comprises the zeolitic material at a loading (I1")/(g/in$^3$) and the non-zeolitic oxidic material at a loading (I2")/(g/in$^3$), wherein the ratio of (I1") to (I2"), (I1"):(I2"), is in the range of from 2:1 to 18:1, more preferably in the range of from 4:1 to 16:1, more preferably in the range of from 5:1 to 15:1, more preferably in the range of from 8:1 to 14:1.

It is preferred that the third coating comprises copper in an amount, calculated as CuO, being in the range of from 0.5 to 7 weight-%, more preferably in the range of from 1 to 6 weight-%, more preferably in the range of from 2.5 to 4.5 weight-%, more preferably in the range of from 2.5 to 3.75 weight-%, based on the weight of the zeolitic material of the third coating.

It is preferred that the zeolitic material of the third coating comprises copper, wherein more preferably from 75 to 100 weight-%, more preferably from 80 to 100 weight-% of the copper comprised in the third coating is comprised in said zeolitic material.

It is preferred that the catalyst comprises the third coating at a loading in the range of from 0.3 to 3 g/in$^3$, more preferably in the range of from 0.4 to 2 g/in$^3$, more preferably in the range of from 0.5 to 1.5 g/in$^3$.

Preferably from 98 to 100 weight-%, more preferably from 99 to 100 weight-%, more preferably from 99.5 to 100 weight-% of the third coating consist of the zeolitic material, copper, calculated as CuO, a non-zeolitic oxidic material as defined in the foregoing, and more preferably an oxidic material as defined in the foregoing.

Preferably from 95 to 100 weight-%, more preferably from 98 to 100 weight-%, more preferably from 99 to 100 weight-%, of the third coating is comprised in the pores of the internal walls.

Preferably from 0 to 0.01 weight-%, more preferably from 0 to 0.001 weight-%, more preferably from 0 to 0.0001 weight-% of the third coating consist of manganese, more preferably of manganese, cobalt and nickel.

Preferably from 0 to 0.01 weight-%, more preferably from 0 to 0.001 weight-%, more preferably from 0 to 0.0001 weight-% of the third coating consist of palladium, more preferably of palladium, platinum and rhodium, more preferably of palladium, platinum, rhodium, osmium and iridium, more preferably of noble metals.

It is preferred that from 98 to 100 weight-%, more preferably from 99 to 100 weight-%, more preferably from 99.5 to 100 weight-% of the selective catalytic reduction catalyst of the present invention consist of the porous wall-flow filter substrate, the first coating, the second coating and the third coating.

According to a fourth aspect of the present invention, it is preferred that the selective catalytic reduction catalyst of the present invention comprises the first coating, the second coating and the third coating,
wherein the zeolitic material has a framework type CHA and wherein the first coating further comprises a non-zeolitic oxidic material, wherein the non-zeolitic oxidic material of the first coating more preferably comprises one or more of alumina, titania, silica, zirconia, ceria, and iron oxide, more preferably one or more of alumina, titania and silica, more preferably one or more of alumina and silica, more preferably alumina and silica,
wherein the second coating comprises copper, and an 8-membered ring pore zeolitic material,
wherein the zeolitic material has a framework type CHA and wherein the second coating further comprises a non-zeolitic oxidic material, wherein the non-zeolitic oxidic material of the second coating more preferably comprises one or more of alumina, titania, silica, zirconia, ceria, and iron oxide, more preferably one or more of alumina, titania and silica, more preferably one or more of alumina and silica, more preferably alumina and silica;
wherein the third coating comprises copper and an 8-membered ring pore zeolitic material,
wherein the zeolitic material has a framework type CHA and wherein the third coating further comprises a non-zeolitic oxidic material, wherein the non-zeolitic oxidic material more preferably comprises one or more of alumina, titania, silica, zirconia, ceria, and iron oxide, more preferably one or more of alumina, titania and silica, more preferably one or more of alumina and silica, more preferably alumina and silica;
wherein x+y is in the range of from 95 to 100,
wherein there is a gap between the first coating and the second coating, wherein the gap extends over g % of the substrate axial length, g being at most 10, more preferably in the range of from 0.2 to 5, more preferably in the range of from 0.5 to 2, wherein x+y+g=100;
wherein z is more preferably in the range of from 98 to 100.

In the context of the present invention, it is preferred that the ratio of the loading of copper in the inlet zone, Cu(in), calculated as CuO, relative to the loading of copper in the outlet zone, Cu(out), calculated as CuO, Cu(in):Cu(out), is in the range of from 0.30:1 to 0.95:1, more preferably in the range of from 0.40:1 to 0.92:1, more preferably in the range of from 0.50:1 to 0.90:1, more preferably in the range of from 0.55:1 to 0.88:1.

In the context of the present invention, it is preferred that the ratio of the loading of the zeolitic material in the outlet zone I(out)/(g/in$^3$) relative to the loading of the zeolitic material in the inlet zone l(in)/(g/in$^3$), I(out)/l(in), is in the range of from 0.9:1 to 1.1:1, more preferably in the range of from 0.95:1 to 1.05:1. It is more preferred that the ratio of the loading of copper in the inlet zone, Cu(in), calculated as CuO, relative to the loading of copper in the outlet zone, Cu(out), calculated as CuO, Cu(in):Cu(out), is in the range of from 0.30:1 to 0.95:1, more preferably in the range of from 0.40:1 to 0.92:1, more preferably in the range of from 0.50:1 to 0.90:1, more preferably in the range of from 0.55:1 to 0.88:1, and that the ratio of the loading of the zeolitic material in the outlet zone I(out)/(g/in$^3$) relative to the loading of the zeolitic material in the inlet zone l(in)/(g/in$^3$), I(out)/l(in), is in the range of from 0.9:1 to 1.1:1, more preferably in the range of from 0.95:1 to 1.05:1.

In the context of the present invention, it is preferred that the wall-flow filter substrate comprises, more preferably consists of, a cordierite, a silicon carbide or an aluminum titanate, more preferably a silicon carbide or an aluminum titanate, more preferably a silicon carbide.

In the context of the present invention, it is preferred that the porous internal walls comprising the first coating, the second coating and optionally the third coating have a relative average porosity in the range of from 35 to 70%, more preferably in the range of from 58 to 70%, wherein the relative average porosity is defined as the average porosity of the internal walls comprising the first coating, the second coating and optionally the third coating to the average porosity of the internal walls without the first coating, the second coating and the third coating, wherein the average porosity is defined according to Reference Example 2.

The present invention further relates to a process for preparing the selective catalytic reduction catalyst according to the present invention, comprising (a) providing an uncoated porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

(b) optionally providing an aqueous mixture comprising water, a source of copper and an 8-membered ring pore zeolitic material, disposing said mixture on the substrate provided in (a), over z % of the substrate axial length, with z being in the range of from 95 to 100, calcining the substrate comprising the mixture disposed thereon, obtaining the substrate comprising a third coating, wherein at least 90 weight-% of said coating are comprised in the pores of the internal walls of the substrate;

(c) providing an aqueous mixture comprising water, a source of copper and an 8-membered ring pore zeolitic material, disposing said mixture on the substrate provided in (a), or on the substrate comprising a third coating obtained in (b), over x % of the substrate axial length from the inlet end toward the outlet end of the substrate, with x being in the range of from 10 to 100, calcining the substrate comprising the mixture disposed thereon, obtaining the substrate comprising a first coating, and optionally a third coating;

(d) providing an aqueous mixture comprising water, a source of copper, and optionally an 8-membered ring pore zeolitic material, disposing said mixture on the substrate provided in (c), over y % of the substrate axial length from the outlet end toward the inlet end of the substrate, with y being in the range of from 20 to 90, calcining the substrate comprising the mixture disposed thereon, obtaining the substrate comprising a first coating, a second coating, and optionally a third coating;

wherein x+y is at least 90;

wherein y % of w from the outlet end toward the inlet end of the substrate define the outlet zone of the coated substrate and (100−y) % of w from the inlet end toward the outlet end of the substrate define the inlet zone of the coated substrate; wherein the ratio of the loading of copper in the inlet zone, Cu(in), calculated as CuO, relative to the loading of copper in the outlet zone, Cu(out), calculated as CuO, Cu(in):Cu(out), is less than 1.1.

As to (c), it is preferred that it comprises (c.1) providing an aqueous mixture comprising water, a source of copper and an 8-membered ring pore zeolitic material;

(c.2) disposing said mixture on the substrate provided in (a), over x % of the substrate axial length from the inlet end toward the outlet end of the substrate, with x being in the range of from 10 to 100, wherein disposing the mixture is performed by spraying the mixture onto the substrate or by immersing the substrate into the mixture, more preferably by immersing the substrate into the mixture;

(c.3) more preferably drying the substrate obtained in (c.2) in a gas atmosphere having a temperature in the range of from 60° C. to 300° C., more preferably in the range of from 90° C. to 150° C., the gas atmosphere more preferably comprising oxygen;

(c.4) calcining the substrate obtained in (c.2), more preferably in (c.3), in a gas atmosphere having a temperature in the range of from 300 to 900° C., more preferably in the range of from 400 to 600° C., the gas atmosphere more preferably comprising oxygen.

As to drying according to (c.3), it is preferred that it is performed for a duration in the range of from 10 minutes to 4 hours, more preferably in the range of from 20 minutes to 3 hours, more preferably in the range of from 30 minutes to 2 hours.

As to calcining according to (c.4), it is preferred that it is performed for a duration in the range of from 10 minutes to 4 hours, more preferably in the range of from 20 minutes to 3 hours, more preferably in the range of from 30 minutes to 2.5 hours.

As to (c.1), it is preferred that it comprises (c.1.1) preparing a first mixture comprising water and a source of copper, wherein the source of copper is more preferably selected from copper acetate, copper oxide, copper nitrate, and a mixture thereof, more preferably is copper oxide, more preferably CuO;

(c.1.2) more preferably milling the first mixture, more preferably until the particles of the first mixture have a Dv90 in the range of from 0.5 to 20 micrometers, the Dv90 being determined as described in Reference Example 3; optionally adding a precursor of an oxidic material, wherein the precursor of the oxidic material is more preferably a zirconium salt, more preferably zirconium acetate;

(c.1.3) preparing a second mixture comprising water and the zeolitic material, wherein the zeolitic material optionally comprises copper;

(c.1.4) admixing the second mixture obtained in (c.1.3) with the first mixture obtained in (c.1.1), more preferably in (c.1.2).

As to (c.1), it is preferred that it further comprises (c.1.5) preparing a third mixture comprising water, a non-zeolitic oxidic material as defined in the foregoing, and more preferably comprising an acid, more preferably an organic acid, more preferably tartaric acid;

(c.1.6) admixing the third mixture obtained in (c.1.5) with the mixture obtained in (c.1.4), more preferably adding an acid, more preferably an organic acid, more preferably acetic acid;

wherein (c.1) more preferably consists of (c.1.1), (c.1.2), (c.1.3), (c.1.4), (c.1.5) and (c.1.6).

As to milling in (c.1.2), it is preferred that it is performed until the particles of the first mixture have a Dv90 in the range of from 5 to 15 micrometers, more preferably in the range of from 5 to 12 micrometers, the Dv90 being determined as described in Reference Example 3.

As to (c.1.4), it is preferred that, after admixing the second mixture with the first mixture, it further comprises milling the obtained mixture, more preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

As to (d), it is preferred that it comprises (d.1) providing an aqueous mixture comprising water, a source of copper, and optionally an 8-membered ring pore zeolitic material;

(d.2) disposing said mixture on the substrate provided in (a), over y % of the substrate axial length from the outlet end toward the inlet end of the substrate, with y being in the range of from 20 to 90, wherein disposing the mixture is performed by spraying the mixture onto the substrate or by immersing the substrate into the mixture, more preferably by immersing the substrate into the mixture;

(d.3) more preferably drying the substrate obtained in (d.2) in a gas atmosphere having a temperature in the range of from 60° C. to 300° C., more preferably in the range of from 90° C. to 150° C., the gas atmosphere more preferably comprising oxygen;

(d.4) calcining the substrate obtained in (d.2), more preferably in (d.3), in a gas atmosphere having a temperature in the range of from 300 to 900° C., more preferably in the range of from 400 to 600° C., the gas atmosphere more preferably comprising oxygen.

As to drying according to (d.3), it is preferred that it is performed for a duration in the range of from 10 minutes to 4 hours, more preferably in the range of from 20 minutes to 3 hours, more preferably in the range of from 30 minutes to 2 hours.

As to calcining according to (d.4), it is preferred that it is performed for a duration in the range of from 10 minutes to 4 hours, more preferably in the range of from 20 minutes to 3 hours, more preferably in the range of from 30 minutes to 2.5 hours.

As to (d.1), it is preferred that it comprises (d.1.1) preparing a first mixture comprising water and a source of copper, wherein the source of copper is more preferably selected from copper acetate, copper oxide, copper nitrate, and a mixture thereof, more preferably is copper oxide, more preferably CuO;

(d.1.2) more preferably milling the first mixture, more preferably until the particles of the first mixture have a Dv90 in the range of from 0.5 to 20 micrometers, the Dv90 being determined as described in Reference Example 3, optionally adding a precursor of an oxidic material, wherein the precursor of the oxidic material is more preferably a zirconium salt, more preferably zirconium acetate;

(d.1.3) preparing a second mixture comprising water and the zeolitic material, wherein the zeolitic material optionally comprises copper;

(d.1.4) admixing the second mixture obtained in (d.1.3) with the first mixture obtained in (d.1.1), more preferably in (d.1.2).

As to (d.1), it is more preferred that it further comprises (d.1.5) preparing a third mixture comprising water, a non-zeolitic oxidic material as defined in the foregoing, and more preferably comprising an acid, more preferably an organic acid, more preferably tartaric acid;

(d.1.6) admixing the third mixture obtained in (d.1.5) with the mixture obtained in (d.1.4), more preferably adding an acid, more preferably an organic acid, more preferably acetic acid;

wherein (d.1) more preferably consists of (d.1.1), (d.1.2), (d.1.3), (d.1.4), (d.1.5) and (d.1.6).

As to (d.1.4), it is preferred that, after admixing the second mixture with the first mixture, it further comprises milling the obtained mixture, more preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

Alternatively, as to (d.1), it is preferred that it comprises, more preferably consists of, (d.1.I) preparing a first mixture comprising water and a source of copper, wherein the source of copper is more preferably selected from copper acetate, copper oxide, copper nitrate, and a mixture thereof, more preferably is copper oxide, more preferably CuO;

(d.1.II) milling the first mixture, more preferably until the particles of the first mixture have a Dv90 in the range of from 0.5 to 20 micrometers, the Dv90 being determined as described in Reference Example 3.

Alternatively, as to (d.1), it is preferred that it comprises, more preferably consists of, (d.1.i) preparing a first mixture comprising water and a source of copper, wherein the source of copper is more preferably selected from copper acetate, copper oxide, copper nitrate, and a mixture thereof, more preferably is copper oxide, more preferably CuO;

(d.1.ii) more preferably milling the first mixture, more preferably until the particles of the first mixture have a Dv90 in the range of from 0.5 to 20 micrometers, the Dv90 being determined as described in Reference Example 3;

(d.1.iii) admixing a non-zeolitic oxidic material as defined in the foregoing, to the first mixture obtained in (d.1.i), more preferably in (d.1.ii), and more preferably adding an acid, more preferably an organic acid, more preferably tartaric acid.

It is preferred that milling in each of (d.1.2), (d.1.II) and (d.1.ii) is performed until the particles of the first mixture have a Dv90 in the range of from 5 to 15 micrometers, more preferably in the range of from 5 to 12 micrometers, the Dv90 being determined as described in Reference Example 3.

As to (b), it is preferred that it comprises (b.1) providing an aqueous mixture comprising water, a source of copper and an 8-membered ring pore zeolitic material;

(b.2) disposing said mixture on the substrate provided in (a), over z % of the substrate axial length, with z being in the range of from 95 to 100, more preferably in the range of from 98 to 100, from the inlet end toward the outlet end or from the outlet end toward the inlet end of the substrate, wherein disposing the mixture is performed by spraying the mixture onto the substrate or by immersing the substrate into the mixture, more preferably by immersing the substrate into the mixture;

(b.3) more preferably drying the substrate obtained in (b.2) in a gas atmosphere having a temperature in the range of from 60° C. to 300° C., more preferably in the range of from 90° C. to 150° C., the gas atmosphere more preferably comprising oxygen;

(b.4) calcining the substrate obtained in (b.2), more preferably in (b.3), in a gas atmosphere having a temperature in the range of from 300 to 900° C., more preferably in the range of from 400 to 600° C., the gas atmosphere more preferably comprising oxygen.

As to drying according to (b.3), it is preferred that it is performed for a duration in the range of from 10 minutes to 4 hours, more preferably in the range of from 20 minutes to 3 hours, more preferably in the range of from 30 minutes to 2 hours.

As to calcining according to (b.4), it is preferred that it is performed for a duration in the range of from 10 minutes to 4 hours, more preferably in the range of from 20 minutes to 3 hours, more preferably in the range of from 30 minutes to 2.5 hours.

As to (b.1), it is preferred that it comprises (b.1.1) preparing a first mixture comprising water and a source of copper, wherein the source of copper is more preferably selected from copper acetate, copper oxide, copper nitrate, and a mixture thereof, more preferably is copper oxide, more preferably CuO;

(b.1.2) more preferably milling the first mixture, more preferably until the particles of the first mixture have a Dv90 in the range of from 0.5 to 20 micrometers, the Dv90 being determined as described in Reference Example 3, optionally adding a source of an oxidic material as defined in the foregoing;

(b.1.3) preparing a second mixture comprising water and the zeolitic material, wherein the zeolitic material optionally comprises copper;

(b.1.4) admixing the second mixture obtained in (b.1.3) with the first mixture obtained in (b.1.1), more preferably in (b.1.2).

It is preferred that (b.1) further comprises (b.1.5) preparing a third mixture comprising water, a non-zeolitic oxidic material as defined in the foregoing, and more preferably comprising an acid, more preferably an organic acid, more preferably tartaric acid;

(b.1.6) admixing the third mixture obtained in (b.1.5) with the mixture obtained in (b.1.4), more preferably adding an acid, more preferably an organic acid, more preferably acetic acid;

wherein (b.1) more preferably consists of (b.1.1), (b.1.2), (b.1.3), (b.1.4), (b.1.5) and (b.1.6).

As to milling in (b.1.2), it is preferred that it is performed until the particles of the first mixture have a Dv90 in the range of from 5 to 15 micrometers, more preferably in the range of from 5 to 12 micrometers, the Dv90 being determined as described in Reference Example 3.

As to (b.1.4), it is preferred that, after admixing the second mixture with the first mixture, it further comprises milling the obtained mixture, more preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

It is preferred that the process consists of (a), (b), (c) and (d).

The present invention further relates to a selective catalytic reduction catalyst, preferably the selective catalytic reduction catalyst according to the present invention, obtainable or obtained or preparable or prepared by a process according to the present invention.

The present invention further relates to an exhaust gas treatment system for treating an exhaust gas stream exiting a passive ignition engine, said exhaust gas treatment system having an upstream end for introducing said exhaust gas stream into said exhaust gas treatment system, wherein said exhaust gas treatment system comprises a selective catalytic reduction catalyst according to the present invention, and one or more of a diesel oxidation catalyst, a selective catalytic reduction catalyst, an ammonia oxidation catalyst, a NOx trap and a particulate filter.

It is preferred that the exhaust gas treatment system comprises a diesel oxidation catalyst disposed downstream of the engine and upstream of the selective catalytic reduction catalyst according to the present invention, wherein optionally said diesel oxidation catalyst contains a NOx storage functionality.

It is more preferred that the exhaust gas treatment system further comprises one or more of a selective catalytic reduction catalyst and an ammonia oxidation catalyst disposed downstream of the selective catalytic reduction catalyst according to the present invention.

It is preferred that the exhaust gas treatment system further comprises a selective catalytic reduction catalyst disposed downstream of the diesel oxidation catalyst and upstream of the selective catalytic reduction catalyst according to the present invention.

The present invention further relates to a use of a selective catalytic reduction catalyst according to the present invention for the selective catalytic reduction of NOx.

The present invention further relates to a use of an exhaust gas treatment system according to any one of embodiments 102 to 105 for the treatment of an exhaust gas stream from a passive ignition engine.

The present invention further relates to a method for selectively catalytically reducing nitrogen oxides, wherein the nitrogen oxides are comprised in an exhaust gas stream, said method comprising (1) providing the exhaust gas stream, more preferably from a diesel engine;

(2) passing the exhaust gas stream provided in (1) through the selective catalytic reduction catalyst according to the present invention.

The present invention further relates to a method for treating an exhaust gas stream from a diesel engine, said method comprising (1') providing said exhaust gas stream;

(2') passing the exhaust gas stream provided in (1') through the exhaust gas treatment system according to the present invention.

In the context of the present invention, the term "based on the weight of the zeolitic material" refers to the weight of the zeolitic material alone, meaning without copper. Further, in the context of the present invention, the term "based on the weight of the Chabazite" refers to the weight of the Chabazite alone, meaning without copper.

Further, in the context of the present invention, the term "loading of a given component/coating" (in $g/in^3$ or $g/ft^3$) refers to the mass of said component/coating per volume of the filter substrate, wherein the volume of the filter substrate is the volume which is defined by the cross-section of the filter substrate times the axial length of the filter substrate over which said component/coating is present. For example, if reference is made to the loading of a first coating extending over x % of the axial length of the filter substrate and having a loading of X g/in$^3$, said loading would refer to X gram of the first coating per x % of the volume (in in$^3$) of the entire filter substrate.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

The present invention is further illustrated by the following set of embodiments and combinations of embodiments resulting from the dependencies and back-references as indicated. In particular, it is noted that in each instance where a range of embodiments is mentioned, for example in the context of a term such as "The selective catalytic reduction catalyst of any one of embodiments 1 to 3", every embodiment in this range is meant to be explicitly disclosed for the skilled person, i.e. the wording of this term is to be understood by the skilled person as being synonymous to "The selective catalytic reduction catalyst of any one of embodiments 1, 2 and 3".

1. A selective catalytic reduction catalyst for the treatment of an exhaust gas stream of a passive ignition engine, the catalyst comprising
    a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
    wherein the catalyst further comprises a first coating, said first coating extending over x % of the substrate axial length from the inlet end toward the outlet end of the substrate, x being in the range of from 10 to 100, wherein the first coating comprises copper and an 8-membered ring pore zeolitic material;
    wherein the catalyst further comprises a second coating, the second coating extending over y % of the substrate axial length from the outlet end toward the inlet end of the substrate, y being in the range of from 20 to 90, wherein the second coating comprises copper, and optionally an 8-membered ring pore zeolitic material;
    wherein the catalyst optionally further comprises a third coating, at least 90 weight-% of thereof being comprised in the pores of the internal walls, the third coating extending over z % of the substrate axial length, z being in the range of from 95 to 100, wherein the third coating comprises copper and an 8-membered ring pore zeolitic material;
    wherein x+y is at least 90;
    wherein y % of w from the outlet end toward the inlet end of the substrate define the outlet zone of the coated substrate and (100−y) % of w from the inlet end toward the outlet end of the substrate define the inlet zone of the coated substrate;
    wherein the ratio of the loading of copper in the inlet zone, Cu(in), calculated as CuO, relative to the loading of copper in the outlet zone, Cu(out), calculated as CuO, Cu(in):Cu(out), is less than 1:1.

2. The selective reduction catalyst of embodiment 1, wherein x is in the range of from 20 to 80 and wherein y is in the range of from 20 to 80.

3. The selective reduction catalyst of embodiment 1 or 2, wherein x is in the range of from 55 to 80, preferably in the range of from 60 to 75.

4. The selective reduction catalyst of any one of embodiments 1 to 3, wherein y is in the range of from 20 to 45, preferably in the range of from 25 to 40.

5. The selective reduction catalyst of embodiment 1 or 2, wherein x is in the range of from 20 to 45, preferably in the range of from 25 to 40.

6. The selective reduction catalyst of embodiment 1 or 5, wherein y is in the range of from 55 to 80, preferably in the range of from 60 to 75.

7. The selective reduction catalyst of embodiment 1 or 2, wherein x is in the range of from 40 to 60, preferably in the range of from 45 to 55.

8. The selective reduction catalyst of embodiment 1 or 7, wherein y is in the range of from 40 to 60, preferably in the range of from 45 to 55.

9. The selective catalytic reduction catalyst of any one of embodiments 1 to 8, wherein x+y is in the range of from 95 to 100.

10. The selective catalytic reduction catalyst of any one of embodiments 1 to 9, wherein there is a gap between the first coating and the second coating, wherein the gap extends over g % of the substrate axial length, g being at most 10, preferably in the range of from 0.2 to 5, more preferably in the range of from 0.5 to 2, wherein x+y+g=100, wherein the gap is preferably at least partially within the interior of the filter substrate.

11. The selective catalytic reduction catalyst of any one of embodiments 1 to 9, wherein x+y=100, wherein there is no gap between the first coating and the second coating.

12. The selective reduction catalyst of embodiment 1, wherein x is in the range of from 95 to 100 and wherein y is in the range of from 20 to 50, preferably in the range of from 25 to 40.

13. The selective catalytic reduction catalyst of embodiment 1 or 12, wherein x+y>100, preferably wherein 100<x+y≤150.

14. The selective catalytic reduction catalyst of embodiment 1, wherein there is an overlap of the first coating and the second coating over q % of the substrate axial length, q being at most 50, preferably in the range of from 10 to 45, more preferably in the range of from 20 to 40, wherein x+y−q=100, wherein the overlap is preferably at least partially within the interior of the filter substrate.

15. The selective catalytic reduction catalyst of any one of embodiments 1 to 12, wherein the zeolitic material contained in the first coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, AFX a mixture of two or more thereof and a mixed type of two or more thereof, more preferably selected from the group consisting of CHA and AEI, wherein the zeolitic material contained in the first coating has a framework type CHA; wherein preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1, wherein more preferably, at most 1 weight-%, preferably from 0 to 0.5 weight-%, more preferably from 0 to 0.1 weight-%, of the framework structure of the zeolitic material consist of P.

16. The selective catalytic reduction catalyst of embodiment 15, wherein the zeolitic material comprised in the first coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

17. The selective catalytic reduction catalyst of any one of embodiments 1 to 16, wherein the first coating comprises the zeolitic material at a loading in the range of from 0.1 to 3 $g/in^3$, preferably in the range of from 0.2 to 2.5 $g/in^3$, more preferably in the range of from 0.7 to 2.25 $g/in^3$.

18. The selective catalytic reduction catalyst of any one of embodiments 1 to 17, wherein the first coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia;
wherein the first coating comprises the oxidic material at a loading in the range of from 0.01 to 0.2 $g/in^3$, preferably in the range of from 0.03 to 0.1 $g/in^3$.

19. The selective catalytic reduction catalyst of any one of embodiments 1 to 18, wherein the first coating further comprises a non-zeolitic oxidic material, wherein the non-zeolitic oxidic material preferably comprises one or more of alumina, titania, silica, zirconia, ceria, and iron oxide, more preferably one or more of alumina, titania and silica, more preferably one or more of alumina and silica, more preferably alumina and silica;
wherein preferably from 95 to 100 weight-%, more preferably from 98 to 100 weight-%, more preferably from 99 to 100 weight-%, more preferably 99.5 to 100 weight-% of the non-zeolitic oxidic material consist of alumina and silica;
wherein the weight ratio of alumina to silica is preferably in the range of from 10:1 to 20:1, preferably in the range of from 12:1 to 18:1.

20. The selective catalytic reduction catalyst of embodiment 19, wherein the first coating comprises the non-zeolitic oxidic material at a loading in the range of from 0.08 to 0.8 $g/in^3$, preferably in the range of from 0.09 to 0.3 $g/in^3$.

21. The selective catalytic reduction catalyst of embodiment 19 or 20, wherein the first coating comprises the zeolitic material at a loading $(l1)/(g/in^3)$ and the non-zeolitic oxidic material at a loading $(l2)/(g/in^3)$, wherein the ratio of (l1) to (l2), (l1):(l2), is in the range of from 2:1 to 18:1, preferably in the range of from 4:1 to 16:1, more preferably in the range of from 5:1 to 15:1, more preferably in the range of from 8:1 to 14:1.

22. The selective catalytic reduction catalyst of any one of embodiments 1 to 21, wherein the first coating comprises copper in an amount, calculated as CuO, being in the range of from 0.5 to 7 weight-%, preferably in the range of from 1 to 6 weight-%, more preferably in the range of from 2.5 to 4.5 weight-%, more preferably in the range of from 2.5 to 3.75 weight-%, based on the weight of the zeolitic material of the first coating.

23. The selective catalytic reduction catalyst of any one of embodiments 1 to 22, wherein the zeolitic material of the first coating comprises copper, wherein preferably from 75 to 100 weight-%, more preferably from 80 to 100 weight-%, of the copper comprised in the first coating is comprised in said zeolitic material.

24. The selective catalytic reduction catalyst of any one of embodiments 1 to 23, wherein the catalyst comprises the first coating at loading in the range of from 0.1 to 4 $g/in^3$, preferably in the range of from 0.2 to 3 $g/in^3$, more preferably in the range of from 0.5 to 2.5 $g/in^3$.

25. The selective catalytic reduction catalyst of any one of embodiments 1 to 24, wherein from 98 to 100 weight-%, preferably from 99 to 100 weight-%, more preferably from 99.5 to 100 weight-% of the first coating consist of the zeolitic material, copper, calculated as CuO, a non-zeolitic oxidic material as defined in any one of embodiments 18 to 21, and preferably an oxidic material as defined in embodiment 17.

26. The selective catalytic reduction catalyst of any one of embodiments 1 to 25, wherein from 30 to 100 weight-%, preferably from 40 to 100 weight-%, more preferably from 50 to 100 weight-%, more preferably from 80 to 100 weight-% of the first coating are in the pores of the internal walls.

27. The selective catalytic reduction catalyst of any one of embodiments 1 to 25, wherein the first coating is disposed on the surface of the internal walls in the inlet passages.

28. The selective catalytic reduction catalyst of any one of embodiments 1 to 27, wherein from 0 to 0.01 weight-%, preferably from 0 to 0.001 weight-%, more preferably from 0 to 0.0001 weight-% of the first coating consist of manganese, preferably of manganese, cobalt and nickel.

29. The selective catalytic reduction catalyst of any one of embodiments 1 to 28, wherein from 0 to 0.01 weight-%, preferably from 0 to 0.001 weight-%, more preferably from 0 to 0.0001 weight-% of the first coating consist of palladium, preferably of palladium, platinum and rhodium, more preferably of palladium, platinum, rhodium, osmium and iridium, more preferably of noble metals.

30. The selective catalytic reduction catalyst of any one of embodiments 1 to 29, wherein the second coating comprises an 8-membered ring pore zeolitic material, wherein the zeolitic material has preferably a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, AFX a mixture of two or more thereof and a mixed type of two or more thereof, more preferably selected from the group consisting of CHA and AEI, wherein the zeolitic material contained in the second coating has a framework type CHA.

31. The selective catalytic reduction catalyst of embodiment 30, wherein from 95 to 100 weight-%, preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1, wherein more preferably, at most 1 weight-%, preferably from 0 to 0.5 weight-%, more preferably from 0 to 0.1 weight %, of the framework structure of the zeolitic material consist of P.

32. The selective catalytic reduction catalyst of embodiment 30 or 31, wherein the zeolitic material comprised in the second coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

33. The selective catalytic reduction catalyst of any one of embodiments 30 to 32, wherein the second coating comprises the zeolitic material at a loading in the range of from 0.1 to 3 $g/in^3$, preferably in the range of from 0.2 to 2.5 $g/in^3$, more preferably in the range of from 0.7 to 2.25 $g/in^3$.

34. The selective catalytic reduction catalyst of any one of embodiments 30 to 33, wherein the second coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia;
wherein the second coating preferably comprises the oxidic material at a loading in the range of from 0.01 to 0.2 $g/in^3$, more preferably in the range of from 0.03 to 0.1 $g/in^3$.

35. The selective catalytic reduction catalyst of any one of embodiments 30 to 34, wherein the second coating further comprises a non-zeolitic oxidic material, wherein the non-zeolitic oxidic material of the second coating preferably comprises one or more of alumina, titania, silica, zirconia, ceria, and iron oxide, more preferably one or more of alumina, titania and silica, more preferably one or more of alumina and silica, more preferably alumina and silica.

36. The selective catalytic reduction catalyst of embodiment 35, wherein from 95 to 100 weight-%, preferably from 98 to 100 weight-%, more preferably from 99 to 100 weight-%, more preferably 99.5 to 100 weight-% of the non-zeolitic oxidic material of the second coating consist of alumina and silica;
wherein the weight ratio of alumina to silica is preferably in the range of from 10:1 to 20:1, more preferably in the range of from 12:1 to 18:1.

37. The selective catalytic reduction catalyst of embodiment 35 or 36, wherein the second coating comprises the non-zeolitic oxidic material at a loading in the range of from 0.08 to 0.8 $g/in^3$, preferably in the range of from 0.09 to 0.3 $g/in^3$.

38. The selective reduction catalyst of any one of embodiments 35 to 37, wherein the second coating comprises the zeolitic material at a loading (I1')/(g/in$^3$) and the non-zeolitic oxidic material at a loading (I2')/(g/in$^3$), wherein the ratio of (I1') to (I2'), (I1'):(I2'), is in the range of from 2:1 to 18:1, preferably in the range of from 4:1 to 16:1, more preferably in the range of from 5:1 to 15:1, more preferably in the range of from 8:1 to 14:1.

39. The selective catalytic reduction catalyst of any one of embodiments 30 to 38, wherein the second coating comprises copper in an amount, calculated as CuO, being in the range of from 2.5 to 15 weight-%, preferably in the range of from 3 to 10 weight-%, more preferably in the range of from 3.5 to 6 weight-%, based on the weight of the zeolitic material of the second coating.

40. The selective catalytic reduction catalyst of any one of embodiments 30 to 39, wherein the zeolitic material of the second coating comprises copper, wherein preferably from 75 to 100 weight-%, more preferably from 80 to 100 weight-% of the copper comprised in the second coating is comprised in said zeolitic material.

41. The selective catalytic reduction catalyst of any one of embodiments 30 to 40, wherein the catalyst comprises the second coating at a loading in the range of from 0.1 to 4 $g/in^3$, preferably in the range of from 0.2 to 3 $g/in^3$, more preferably in the range of from 0.5 to 2.5 $g/in^3$.

42. The selective catalytic reduction catalyst of any one of embodiments 30 to 41, wherein from 98 to 100 weight-%, preferably from 99 to 100 weight-%, more preferably from 99.5 to 100 weight-% of the second coating consist of the zeolitic material, copper, calculated as CuO, a non-zeolitic oxidic material as defined in any one of embodiments 35 to 38, and preferably an oxidic material as defined in embodiment 34.

43. The selective catalytic reduction catalyst of any one of embodiments 1 to 29, wherein from 98 to 100 weight-%, preferably from 99 to 100 weight-%, more preferably from 99.5 to 100 weight-% of the second coating consist of CuO.

44. The selective catalytic reduction catalyst of any one of embodiments 1 to 29, wherein the second coating further comprises a non-zeolitic oxidic material, wherein the non-zeolitic oxidic material of the second coating preferably comprises one or more of alumina, titania, silica, zirconia, ceria, and iron oxide, more preferably one or more of alumina, titania and silica, more preferably one or more of alumina and silica, more preferably alumina and silica.

45. The selective catalytic reduction catalyst of embodiment 44, wherein from 95 to 100 weight-%, preferably from 98 to 100 weight-%, more preferably from 99 to 100 weight-%, more preferably from 99.5 to 100 weight-% of the non-zeolitic oxidic material of the second coating consist of alumina and silica;
wherein the weight ratio of alumina to silica is preferably in the range of from 10:1 to 20:1, preferably in the range of from 12:1 to 18:1.

46. The selective reduction catalyst of embodiment 44 or 45, wherein the weight ratio of the non-zeolitic oxidic material of the second coating to copper comprised in the second coating is in the range of from 0.1:1 to 5:1, preferably in the range of from 1:1 to 4:1, more preferably in the range of from 2:1 to 4:1, more preferably in the range of from 2.5:1 to 3.5:1.

47. The selective catalytic reduction catalyst of any one of embodiments 43 to 46, wherein the catalyst comprises the second coating at a loading in the range of from 0.01 to 1 g/in$^3$, preferably in the range of from 0.01 to 0.5 g/in$^3$, more preferably in the range of from 0.015 to 0.3 g/in$^3$.

48. The selective catalytic reduction catalyst of any one of embodiments 44 to 47, wherein from 98 to 100 weight-%, preferably from 99 to 100 weight-%, more preferably from 99.5 to 100 weight-% of the second coating consist of CuO and the non-zeolitic material as defined in any one of embodiments 44 and 45.

49. The selective catalytic reduction catalyst of any one of embodiments 43 to 48, wherein from 0 to 0.001 weight-%, preferably from 0 to 0.0001 weight-%, more preferably from 0 to 0.00001 weight-% of the second coating consist of a zeolitic material.

50. The selective catalytic reduction catalyst of any one of embodiments 1 to 49, wherein from 30 to 100 weight-%, preferably from 50 to 100 weight-%, more preferably from 70 to 100 weight-%, more preferably from 80 to 100 weight-% of the second coating are in the pores of the internal walls.

51. The catalytic reduction catalyst of any one of embodiments 1 to 49, wherein the second coating is disposed on the surface of the internal walls in the outlet passages.

52. The selective catalytic reduction catalyst of any one of embodiments 1 to 51, wherein from 0 to 0.01 weight-%, preferably from 0 to 0.001 weight-%, more preferably from 0 to 0.0001 weight-% of the second coating consist of consist of manganese, preferably of manganese, cobalt and nickel.

53. The selective catalytic reduction catalyst of any one of embodiments 1 to 52, wherein from 0 to 0.01 weight-%, preferably from 0 to 0.001 weight-%, more preferably from 0 to 0.0001 weight-% of the second coating consist of palladium, preferably of palladium, platinum and rhodium, more preferably of palladium, platinum, rhodium, osmium and iridium, more preferably of noble metals.

54. The selective catalytic reduction catalyst of any one of embodiments 1 to 53, wherein the catalyst further comprises the third coating, wherein the third coating extends over z % of the substrate axial length from the inlet end to the outlet end or from the outlet end to the inlet end.

55. The selective catalytic reduction catalyst of embodiment 54, wherein the third coating is disposed under the first coating and/or the second coating when present in the pores of the porous internal walls, preferably under the first coating and the second coating when present in the pores of the porous internal walls.

56. The selective catalytic reduction catalyst of embodiment 54 or 55, wherein the zeolitic material of the third coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, AFX, a mixture of two or more thereof and a mixed type of two or more thereof, more preferably selected from the group consisting of CHA and AEI, wherein the zeolitic material has a framework type CHA.

57. The selective catalytic reduction catalyst of embodiment 56, wherein from 95 to 100 weight-%, preferably from 98 to 100 weight-%, more preferably from 99 to 100 weight-% of the framework structure of the zeolitic material consist of Si, Al, and O, wherein in the framework structure, the molar ratio of Si to Al, calculated as molar SiO$_2$:Al$_2$O$_3$, is preferably in the range of from 2:1 to 50:1, more preferably in the range of from 2:1 to 40:1, more preferably in the range of from 5:1 to 30:1, more preferably in the range of from 10:1 to 30:1, more preferably in the range of from 16:1 to 28:1, wherein more preferably, at most 1 weight-%, preferably from 0 to 0.5 weight-%, more preferably from 0 to 0.1 weight %, of the framework structure of the zeolitic material consist of P.

58. The selective catalytic reduction catalyst of embodiment 56 or 57, wherein the zeolitic material comprised in the third coating, preferably having a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

59. The selective catalytic reduction catalyst of any one of embodiments 54 to 58, wherein the third coating comprises the zeolitic material at a loading in the range of from 0.1 to 3 g/in$^3$, preferably in the range of from 0.3 to 1 g/in$^3$.

60. The selective catalytic reduction catalyst of any one of embodiments 54 to 59, wherein the third coating further comprises an oxidic material, wherein the oxidic material preferably comprises one or more of zirconia, alumina, titania, silica, and a mixed oxide comprising two or more of Zr, Al, Ti, and Si, wherein the oxidic material more preferably comprises one or more of alumina and zirconia, more preferably zirconia;
wherein the third coating preferably comprises the oxidic material at a loading in the range of from 0.01 to 0.4 g/in$^3$, preferably in the range of from 0.02 to 0.1 g/in$^3$.

61. The selective catalytic reduction catalyst of any one of embodiments 54 to 60, wherein the third coating further comprises a non-zeolitic oxidic material, wherein the non-zeolitic oxidic material preferably comprises one or more of alumina, titania, silica, zirconia, ceria, and iron oxide, more preferably one or more of alumina, titania and silica, more preferably one or more of alumina and silica, more preferably alumina and silica.

62. The selective catalytic reduction catalyst of embodiment 61, wherein from 95 to 100 weight-%, preferably from 98 to 100 weight-%, more preferably from 99 to 100 weight-%, more preferably 99.5 to 100 weight-% of the non-zeolitic oxidic material of the third coating consist of alumina and silica;
wherein the weight ratio of alumina to silica is preferably in the range of from 10:1 to 20:1, preferably in the range of from 12:1 to 18:1.

63. The selective catalytic reduction catalyst of embodiment 61 or 62, wherein the third coating comprises the non-zeolitic oxidic material at a loading in the range of from 0.02 to 0.8 g/in$^3$, preferably in the range of from 0.04 to 0.2 g/in$^3$.

64. The selective reduction catalyst of any one of embodiment 61 to 63, wherein the third coating comprises the zeolitic material at a loading (l1")/(g/in$^3$) and the non-zeolitic oxidic material at a loading (l2")/(g/in$^3$), wherein the ratio of (l1") to (l2"), (l1"):(l2"), is in the range of from 2:1 to 18:1, preferably in the range of from 4:1 to 16:1, more preferably in the range of from 5:1 to 15:1, more preferably in the range of from 8:1 to 14:1.

65. The selective catalytic reduction catalyst of any one of embodiments 54 to 64, wherein the third coating comprises copper in an amount, calculated as CuO, being in the range of from 0.5 to 7 weight-%, preferably in the range of from 1 to 6 weight-%, more preferably in the range of from 2.5 to 4.5 weight-%, more preferably in the range of from 2.5 to 3.75 weight-%, based on the weight of the zeolitic material of the third coating.

66. The selective catalytic reduction catalyst of any one of embodiments 54 to 65, wherein the zeolitic material of the third coating comprises copper, wherein preferably from 75 to 100 weight-%, more preferably from 80 to 100 weight-% of the copper comprised in the third coating is comprised in said zeolitic material.

67. The selective catalytic reduction catalyst of any one of embodiments 54 to 66, wherein the catalyst comprises the third coating at a loading in the range of from 0.3 to 3 g/in$^3$, preferably in the range of from 0.4 to 2 g/in$^3$, more preferably in the range of from 0.5 to 1.5 g/in$^3$.

68. The selective catalytic reduction catalyst of any one of embodiments 54 to 67, wherein from 98 to 100 weight-%, preferably from 99 to 100 weight-%, more preferably from 99.5 to 100 weight-% of the third coating consist of the zeolitic material, copper, calculated as CuO, a non-zeolitic oxidic material as defined in any one of embodiments 61 to 64, and preferably an oxidic material as defined in embodiment 60.

69. The selective catalytic reduction catalyst of any one of embodiments 54 to 68, wherein from 95 to 100 weight-%, preferably from 98 to 100 weight-%, more preferably from 99 to 100 weight-%, of the third coating is comprised in the pores of the internal walls.

70. The selective catalytic reduction catalyst of any one of embodiments 54 to 69, wherein from 0 to 0.01 weight-%, preferably from 0 to 0.001 weight-%, more preferably from 0 to 0.0001 weight-% of the third coating consist of manganese, preferably of manganese, cobalt and nickel.

71. The selective catalytic reduction catalyst of any one of embodiments 54 to 70, wherein from 0 to 0.01 weight-%, preferably from 0 to 0.001 weight-%, more preferably from 0 to 0.0001 weight-% of the third coating consist of palladium, preferably of palladium, platinum and rhodium, more preferably of palladium, platinum, rhodium, osmium and iridium, more preferably of noble metals.

72. The selective catalytic reduction catalyst of any one of embodiments 1 to 71, wherein the ratio of the loading of copper in the inlet zone, Cu(in), calculated as CuO, relative to the loading of copper in the outlet zone, Cu(out), calculated as CuO, Cu(in):Cu(out), is in the range of from 0.30:1 to 0.95:1, preferably in the range of from 0.40:1 to 0.92:1, more preferably in the range of from 0.50:1 to 0.90:1, more preferably in the range of from 0.55:1 to 0.88:1.

73. The selective catalytic reduction catalyst of any one of embodiments 1 to 72, wherein the ratio of the loading of the zeolitic material in the outlet zone I(out)/(g/in$^3$) relative to the loading of the zeolitic material in the inlet zone I(*in*)/(g/in$^3$),I(out)/I(*in*), is in the range of from 0.9:1 to 1.1:1, preferably in the range of from 0.95:1 to 1.05:1.

74. The selective catalytic reduction catalyst of any one of embodiments 1 to 73, wherein the wall-flow filter substrate comprises, preferably consists of, a cordierite, a silicon carbide or an aluminum titanate, preferably a silicon carbide or an aluminum titanate, more preferably a silicon carbide.

75. The selective catalytic reduction catalyst of any one of embodiments 1 to 74, wherein the porous internal walls comprising the first coating, the second coating and optionally the third coating have a relative average porosity in the range of from 35 to 70%, preferably in the range of from 58 to 70%, wherein the relative average porosity is defined as the average porosity of the internal walls comprising the first coating, the second coating and optionally the third coating to the average porosity of the internal walls without the first coating, the second coating and the third coating, wherein the average porosity is defined according to Reference Example 2.

76. A process for preparing the selective catalytic reduction catalyst according to any one of embodiments 1 to 75, comprising
(a) providing an uncoated porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
(b) optionally providing an aqueous mixture comprising water, a source of copper and an 8-membered ring pore zeolitic material, disposing said mixture on the substrate provided in (a), over z % of the substrate axial length, with z being in the range of from 95 to 100, calcining the substrate comprising the mixture disposed thereon, obtaining the substrate comprising a third coating, wherein at least 90 weight-% of said coating are comprised in the pores of the internal walls of the substrate;
(c) providing an aqueous mixture comprising water, a source of copper and an 8-membered ring pore zeolitic material, disposing said mixture on the substrate provided in (a), or on the substrate comprising a third coating obtained in (b), over x % of the substrate axial length from the inlet end toward the outlet end of the substrate, with x being in the range of from 10 to 100, calcining the substrate comprising the mixture disposed thereon, obtaining the substrate comprising a first coating, and optionally a third coating;
(d) providing an aqueous mixture comprising water, a source of copper, and optionally an 8-membered ring pore zeolitic material, disposing said mixture on the substrate provided in (c), over y % of the substrate axial length from the outlet end toward the inlet end of the substrate, with y being in the range of from 20 to 90, calcining the substrate comprising the mixture disposed thereon, obtaining the substrate comprising a first coating, a second coating, and optionally a third coating;
wherein x+y is at least 90;
wherein y % of w from the outlet end toward the inlet end of the substrate define the outlet zone of the coated substrate and (100−y) % of w from the inlet end toward the outlet end of the substrate define the inlet zone of the coated substrate;
wherein the ratio of the loading of copper in the inlet zone, Cu(in), calculated as CuO, relative to the loading of copper in the outlet zone, Cu(out), calculated as CuO, Cu(in):Cu(out), is less than 1:1.

77. The process of embodiment 76, wherein (c) comprises
(c.1) providing an aqueous mixture comprising water, a source of copper and an 8-membered ring pore zeolitic material;

(c.2) disposing said mixture on the substrate provided in (a), over x % of the substrate axial length from the inlet end toward the outlet end of the substrate, with x being in the range of from 10 to 100, wherein disposing the mixture is performed by spraying the mixture onto the substrate or by immersing the substrate into the mixture, preferably by immersing the substrate into the mixture;

(c.3) preferably drying the substrate obtained in (c.2) in a gas atmosphere having a temperature in the range of from 60° C. to 300° C., more preferably in the range of from 90° C. to 150° C., the gas atmosphere more preferably comprising oxygen; (c.4) calcining the substrate obtained in (c.2), preferably in (c.3), in a gas atmosphere having a temperature in the range of from 300 to 900° C., preferably in the range of from 400 to 600° C., the gas atmosphere preferably comprising oxygen.

78. The process of embodiment 77, wherein drying according to (c.3) is performed for a duration in the range of from 10 minutes to 4 hours, preferably in the range of from 20 minutes to 3 hours, more preferably in the range of from 30 minutes to 2 hours.

79. The process of embodiment 77 or 78, wherein calcining according to (c.4) is performed for a duration in the range of from 10 minutes to 4 hours, preferably in the range of from 20 minutes to 3 hours, more preferably in the range of from 30 minutes to 2.5 hours.

80. The process of any one of embodiments 77 to 79, wherein (c.1) comprises
 (c.1.1) preparing a first mixture comprising water and a source of copper, wherein the source of copper is preferably selected from copper acetate, copper oxide, copper nitrate, and a mixture thereof, more preferably is copper oxide;
 (c.1.2) preferably milling the first mixture, more preferably until the particles of the first mixture have a Dv90 in the range of from 0.5 to 20 micrometers, the Dv90 being determined as described in Reference Example 3; optionally adding a precursor of an oxidic material, wherein the precursor of the oxidic material is preferably a zirconium salt, more preferably zirconium acetate;
 (c.1.3) preparing a second mixture comprising water and the zeolitic material, wherein the zeolitic material optionally comprises copper;
 (c.1.4) admixing the second mixture obtained in (c.1.3) with the first mixture obtained in (c.1.1), preferably in (c.1.2).

81. The process of embodiment 80, wherein (c.1) further comprises
 (c.1.5) preparing a third mixture comprising water, a non-zeolitic oxidic material as defined in any one of embodiments 18 to 21, and preferably comprising an acid, more preferably an organic acid, more preferably tartaric acid;
 (c.1.6) admixing the third mixture obtained in (c.1.5) with the mixture obtained in
 (c.1.4), preferably adding an acid, more preferably an organic acid, more preferably acetic acid;
 wherein (c.1) preferably consists of (c.1.1), (c.1.2), (c.1.3), (c.1.4), (c.1.5) and (c.1.6).

82. The process of embodiment 80 or 81, wherein milling in (c.1.2) is performed until the particles of the first mixture have a Dv90 in the range of from 5 to 15 micrometers, preferably in the range of from 5 to 12 micrometers, the Dv90 being determined as described in Reference Example 3.

83. The process of any one of embodiments 80 to 82, wherein (c.1.4) further comprises milling the obtained mixture, preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

84. The process of embodiment any one of embodiments 76 to 83, wherein (d) comprises
 (d.1) providing an aqueous mixture comprising water, a source of copper, and optionally an 8-membered ring pore zeolitic material;
 (d.2) disposing said mixture on the substrate provided in (a), over y % of the substrate axial length from the outlet end toward the inlet end of the substrate, with y being in the range of from 20 to 90, wherein disposing the mixture is performed by spraying the mixture onto the substrate or by immersing the substrate into the mixture, preferably by immersing the substrate into the mixture;
 (d.3) preferably drying the substrate obtained in (d.2) in a gas atmosphere having a temperature in the range of from 60° C. to 300° C., more preferably in the range of from 90° C. to 150° C., the gas atmosphere more preferably comprising oxygen;
 (d.4) calcining the substrate obtained in (d.2), preferably in (d.3), in a gas atmosphere having a temperature in the range of from 300 to 900° C., preferably in the range of from 400 to 600° C., the gas atmosphere preferably comprising oxygen.

85. The process of embodiment 84, wherein drying according to (d.3) is performed for a duration in the range of from 10 minutes to 4 hours, preferably in the range of from 20 minutes to 3 hours, more preferably in the range of from 30 minutes to 2 hours.

86. The process of embodiment 84 or 85, wherein calcining according to (d.4) is performed for a duration in the range of from 10 minutes to 4 hours, preferably in the range of from 20 minutes to 3 hours, more preferably in the range of from 30 minutes to 2.5 hours.

87. The process of any one of embodiments 84 to 86, wherein (d.1) comprises
 (d.1.1) preparing a first mixture comprising water and a source of copper, wherein the source of copper is preferably selected from copper acetate, copper oxide, copper nitrate, and a mixture thereof, more preferably is copper oxide;
 (d.1.2) preferably milling the first mixture, more preferably until the particles of the first mixture have a Dv90 in the range of from 0.5 to 20 micrometers, the Dv90 being determined as described in Reference Example 3, optionally adding a precursor of an oxidic material, wherein the precursor of the oxidic material is preferably a zirconium salt, more preferably zirconium acetate;
 (d.1.3) preparing a second mixture comprising water and the zeolitic material, wherein the zeolitic material optionally comprises copper;
 (d.1.4) admixing the second mixture obtained in (d.1.3) with the first mixture obtained in (d.1.1), preferably in (d.1.2).

88. The process of embodiment 87, wherein (d.1) further comprises (d.1.5) preparing a third mixture comprising water, a non-zeolitic oxidic material as defined in any one of embodiments 35 to 38, and preferably comprising an acid, more preferably an organic acid, more preferably tartaric acid;

(d.1.6) admixing the third mixture obtained in (d.1.5) with the mixture obtained in (d.1.4), preferably adding an acid, more preferably an organic acid, more preferably acetic acid;

wherein (d.1) preferably consists of (d.1.1), (d.1.2), (d.1.3), (d.1.4), (d.1.5) and (d.1.6).

89. The process of embodiment 87 or 88, wherein (d.1.4) further comprises milling the obtained mixture, preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

90. The process of embodiment 86, wherein (d.1) comprises, preferably consists of,
    (d.1.I) preparing a first mixture comprising water and a source of copper, wherein the source of copper is preferably selected from copper acetate, copper oxide, copper nitrate, and a mixture thereof, more preferably is copper oxide;
    (d.1.II) milling the first mixture, more preferably until the particles of the first mixture have a Dv90 in the range of from 0.5 to 20 micrometers, the Dv90 being determined as described in Reference Example 3.

91. The process of embodiment 86, wherein (d.1) comprises, preferably consists of,
    (d.1.i) preparing a first mixture comprising water and a source of copper, wherein the source of copper is preferably selected from copper acetate, copper oxide, copper nitrate, and a mixture thereof, more preferably is copper oxide;
    (d.1.ii) preferably milling the first mixture, more preferably until the particles of the first mixture have a Dv90 in the range of from 0.5 to 20 micrometers, the Dv90 being determined as described in Reference Example 3;
    (d.1.iii) admixing a non-zeolitic oxidic material as defined in any one of embodiments 44 to 46, to the first mixture obtained in (d.1.i), preferably in (d.1.ii), and preferably adding an acid, more preferably an organic acid, more preferably tartaric acid.

92. The process of any one of embodiments 87 to 91, wherein milling in each of (d.1.2), (d.1.II) and (d.1.ii) is performed until the particles of the first mixture have a Dv90 in the range of from 5 to 15 micrometers, preferably in the range of from 5 to 12 micrometers, the Dv90 being determined as described in Reference Example 3.

93. The process of any one of embodiments 76 to 92, wherein (b) comprises
    (b.1) providing an aqueous mixture comprising water, a source of copper and an 8-membered ring pore zeolitic material;
    (b.2) disposing said mixture on the substrate provided in (a), over z % of the substrate axial length, with z being in the range of from 95 to 100, from the inlet end toward the outlet end or from the outlet end toward the inlet end of the substrate, wherein disposing the mixture is performed by spraying the mixture onto the substrate or by immersing the substrate into the mixture, preferably by immersing the substrate into the mixture;
    (b.3) preferably drying the substrate obtained in (b.2) in a gas atmosphere having a temperature in the range of from 60° C. to 300° C., more preferably in the range of from 90° C. to 150° C., the gas atmosphere more preferably comprising oxygen;
    (b.4) calcining the substrate obtained in (b.2), preferably in (b.3), in a gas atmosphere having a temperature in the range of from 300 to 900° C., preferably in the range of from 400 to 600° C., the gas atmosphere preferably comprising oxygen.

94. The process of embodiment 93, wherein drying according to (b.3) is performed for a duration in the range of from 10 minutes to 4 hours, preferably in the range of from 20 minutes to 3 hours, more preferably in the range of from 30 minutes to 2 hours.

95. The process of embodiment 93 or 94, wherein calcining according to (b.4) is performed for a duration in the range of from 10 minutes to 4 hours, preferably in the range of from 20 minutes to 3 hours, more preferably in the range of from 30 minutes to 2.5 hours.

96. The process of any one of embodiments 93 to 95, wherein (b.1) comprises
    (b.1.1) preparing a first mixture comprising water and a source of copper, wherein the source of copper is preferably selected from copper acetate, copper oxide, copper nitrate, and a mixture thereof, more preferably is copper oxide;
    (b.1.2) preferably milling the first mixture, more preferably until the particles of the first mixture have a Dv90 in the range of from 0.5 to 20 micrometers, the Dv90 being determined as described in Reference Example 3, optionally adding a source of an oxidic material;
    (b.1.3) preparing a second mixture comprising water and the zeolitic material, wherein the zeolitic material optionally comprises copper;
    (b.1.4) admixing the second mixture obtained in (b.1.3) with the first mixture obtained in (b.1.1), preferably in (b.1.2).

97. The process of embodiment 96, wherein (b.1) further comprises
    (b.1.5) preparing a third mixture comprising water, a non-zeolitic oxidic material as defined in any one of embodiments 61 to 64, and preferably comprising an acid, more preferably an organic acid, more preferably tartaric acid;
    (b.1.6) admixing the third mixture obtained in (b.1.5) with the mixture obtained in
    (b.1.4), preferably adding an acid, more preferably an organic acid, more preferably acetic acid;
    wherein (b.1) preferably consists of (b.1.1), (b.1.2), (b.1.3), (b.1.4), (b.1.5) and (b.1.6).

98. The process of embodiment 96 or 97, wherein milling in (b.1.2) is performed until the particles of the first mixture have a Dv90 in the range of from 5 to 15 micrometers, preferably in the range of from 5 to 12 micrometers, the Dv90 being determined as described in Reference Example 3.

99. The process of any one of embodiments 96 to 98, wherein (b.1.4) further comprises milling the obtained mixture, preferably until the particles of the obtained mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

100. The process of any one of embodiments 76 to 99 consisting of (a), (b), (c) and (d).

101. A selective catalytic reduction catalyst, preferably the selective catalytic reduction catalyst according to any one of embodiments 1 to 75, obtainable or obtained or preparable or prepared by a process according to any one of embodiments 76 to 100, preferably embodiment 100.

102. An exhaust gas treatment system for treating an exhaust gas stream exiting a passive ignition engine, said exhaust gas treatment system having an upstream end for introducing said exhaust gas stream into said exhaust gas treatment system, wherein said exhaust gas treatment system comprises a selective catalytic reduction catalyst according to any one of embodiments 1 to 75 and 101, and one or more of a diesel oxidation catalyst, a selective catalytic reduction catalyst, an ammonia oxidation catalyst, a NOx trap and a particulate filter.

103. The exhaust gas treatment system of embodiment 102, comprising a diesel oxidation catalyst disposed downstream of the engine and upstream of the selective catalytic reduction catalyst according to any one of embodiments 1 to 75 and 101, wherein optionally said diesel oxidation catalyst contains a NOx storage functionality.

104. The exhaust gas treatment system of embodiment 103 further comprising one or more of a selective catalytic reduction catalyst and an ammonia oxidation catalyst disposed downstream of the selective catalytic reduction catalyst according to any one of embodiments 1 to 75 and 101.

105. The exhaust gas treatment system of embodiment 103 or 104, further comprising a selective catalytic reduction catalyst disposed downstream of the diesel oxidation catalyst and upstream of the selective catalytic reduction catalyst according to any one of embodiments 1 to 75 and 101.

106. Use of a selective catalytic reduction catalyst according to any one of embodiments 1 to 75 and 101 for the selective catalytic reduction of NOx.

107. Use of an exhaust gas treatment system according to any one of embodiments 102 to 105 for the treatment of an exhaust gas stream from a passive ignition engine.

108. A method for selectively catalytically reducing nitrogen oxides, wherein the nitrogen oxides are comprised in an exhaust gas stream, said method comprising
   (1) providing the exhaust gas stream, preferably from a diesel engine;
   (2) passing the exhaust gas stream provided in (1) through the selective catalytic reduction catalyst according to any one of embodiments 1 to 75 and 101.

109. A method for treating an exhaust gas stream from a diesel engine, said method comprising
   (1') providing said exhaust gas stream;
   (2') passing the exhaust gas stream provided in (1') through the exhaust gas treatment system according to any one of embodiments 102 to 105.

The present invention is further illustrated by the following reference examples, examples, and comparative examples.

EXAMPLES

Reference Example 1 Measurement of the BET Specific Surface Area

The BET specific surface area of the alumina was determined according to DIN 66131 or DIN-ISO 9277 using liquid nitrogen.

Reference Example 2 Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 3 Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Example 1 Selective Catalytic Reduction Catalyst According to the Present Invention (Three Coatings—Loading Ratio Cu(in):Cu(Out) 0.88:1)

Third Coating (Bottom)

A CuO powder having a Dv50 of 33 micrometers was added to water. The amount of CuO was calculated such that the amount of copper after calcination was of 3.5 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite.

Separately, a Cu-Chabazite with a Cu content of 1.25 weight-%, calculated as CuO, based on the weight of the Chabazite (Dv50 of 20 micrometers, a $SiO_2$:$Al_2O_3$ of 25, a primary particle size of less than 0.5 micrometer and a BET specific surface area of about 600 $m^2$/g) was added to water to form a mixture having a solid content of 38 weight-%. The Cu-Chabazite mixture was mixed to the milled copper containing slurry. The amount of the Cu-Chabazite was calculated such that the loading of Chabazite was 84.5% of the loading of the coating after calcination. The resulting slurry was milled using a continuous milling apparatus so that the Dv90 value of the particles was of about 5 micrometers.

Separately, an aqueous slurry having a solid content of 26 weight-% and comprising alumina ($Al_2O_3$ 94 weight-% with $SiO_2$ 6 weight-% having a BET specific surface area of 173 $m^2$/g, a Dv90 of about 5 micrometers) was prepared. The amount of alumina+silica was calculated such that the loading of alumina+silica was 8.5% of the loading of the coating in the catalyst after calcination. A tartaric acid was added to the aqueous slurry. The amount of tartaric acid was calculated such that it was 0.7 weight-% based on the weight of the Chabazite after calcination. The resulting slurry and the Cu-Chabazite containing slurry were combined and 3.2 weight-% of acetic acid, based on the weight of the Chabazite, was added, forming a final slurry. The solid content of the final slurry was adjusted to 34 weight-%.

A porous uncoated wall-flow filter substrate, silicon carbide, (an average porosity of 60.5%, a mean pore size of 20 micrometers and 350 CPSI and 0.28 mm wall thickness, 172.8 mm (diameter)*127.9 mm (length)) was dipped in the final slurry, after a further dilution reducing the solid content of the slurry, from the inlet end to the outlet end over 100% of the substrate axial length of the substrate. A pressure pulse was applied on the outlet end to remove the excess slurry and same pressure was then applied to the inlet end to distribute the slurry evenly in the filter walls. The coated substrate was dried at 140° C. for about 1 hour and then calcined at 450° C. for 2 hours. The loading of the third coating was 0.7 g/in³ after calcination, including 0.59 g/in³ (84.5/100*0.7) of Chabazite, 0.06 g/in³ (8.5/100*0.7) of alumina+silica, 0.03 g/in³ (5/100*0.595) of zirconia, calculated as $ZrO_2$, and 3.5 weight-% of copper, calculated as CuO, based on the weight of Chabazite (0.02 g/in³ of copper, calculated as CuO).

First Coating

The obtained porous coated wall-flow filter substrate was coated with the same slurry prepared for the third coating from the inlet end to the outlet end except that it was over 69% of the substrate axial length of the substrate. The loading of the first coating was 1.3 g/in³ after calcination, including 1.098 g/in³ of Chabazite, 0.1105 g/in³ of alumina+silica, 0.055 g/in³ of zirconia, calculated as $ZrO_2$, and 3.5 weight-% of copper, calculated as CuO, based on the weight of Chabazite (0.038 g/in³ of copper, calculated as CuO).

Second Coating

A CuO powder having a Dv50 of 33 micrometers was added to water. The amount of CuO was calculated such that the amount of copper after calcination was of 4.2 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a Cu-Chabazite with a Cu content of 1.25 weight-%, calculated as CuO, based on the weight of the Chabazite (Dv50 of 20 micrometers, a $SiO_2:Al_2O_3$ of 25, a primary particle size of less than 0.5 micrometer and a BET specific surface area of about 600 m²/g) was added to water to form a mixture having a solid content of 38 weight-%. The Cu-Chabazite mixture was mixed to the CuO-containing slurry. The resulting slurry was milled using a continuous milling apparatus so that the Dv90 value of the particles was of about 5 micrometers. The amount of the Cu-Chabazite was calculated such that the loading of Chabazite was of 84.5% of the loading of the second coating after calcination.

Separately, an aqueous slurry having a solid content of 26 weight-% and comprising alumina ($Al_2O_3$ 94 weight-% with $SiO_2$ 6 weight-% having a BET specific surface area of 173 m²/g, a Dv90 of about 5 micrometers) was prepared. The amount of alumina+silica was calculated such that the loading of alumina+silica was 8.5% of the loading of the second coating in the catalyst after calcination. Tartaric acid was added to the aqueous slurry. The amount of tartaric acid was calculated such that it was 0.7 weight-% based on the weight of the Chabazite after calcination. The resulting slurry and the Cu-Chabazite containing slurry were combined and 1 weight-% of acetic acid, based on the weight of the Chabazite after calcination, was added, forming a final slurry. The solid content of the final slurry was adjusted to 34 weight-%.

The obtained porous coated wall-flow filter substrate was dipped in the final slurry, after a further dilution reducing the solid content of the slurry, from the outlet end to the inlet end over 30% of the substrate axial length of the substrate. A pressure pulse was applied two times from the inlet end. The coated substrate was dried at 140° C. for 1 hour and then calcined at 450° C. for 2 hours. The loading of the second coating was about 1.3 g/in³ after calcination, including 1.098 g/in³ of Chabazite, 0.1105 g/in³ of alumina+silica, 0.055 g/in³ of zirconia, calculated as $ZrO_2$, and 4.2 weight-% of copper, calculated as CuO, based on the weight of Chabazite (0.046 g/in³ of copper, calculated as CuO).

Thus, in the present example, the inlet zone extends over 70% of the substrate axial length from the inlet end to the outlet end of the substrate and comprises the first coating and a part of the third coating and the outlet zone extends over 30% of the substrate axial length from the outlet end to the inlet end of the substrate and comprises the second coating and a part of the third coating. The ratio of the loading of copper in the inlet zone, Cu(in), calculated as CuO, relative to the loading of copper in the outlet zone, Cu(out), calculated as CuO, Cu(in):Cu(out), is about 0.88:1.

Comparative Example 1 Selective Catalytic Reduction Catalyst not According to the Invention (No Zoning)

The coating was obtained by applying the final slurry prepared for the third coating of Example 1 on a substrate. In particular, a porous uncoated wall-flow filter substrate, silicon carbide, (an average porosity of 60.5%, a mean pore size of 20 micrometers and 350 cpsi and 0.28 mm wall thickness, 172.8 mm (diameter)*127.9 mm (length)) was dipped in said final slurry from the inlet end to the outlet end over 100% of the substrate axial length of the substrate. A pressure pulse was applied on the outlet end to remove the excess slurry and same pressure was then applied to the inlet end to distribute the slurry evenly in the filter walls. The coated substrate was dried at 140° C. for 1 hour and then calcined at 450° C. for 2 hours. The loading of the obtained first coat after calcination was 1.2 g/in³.

The coated substrate was once again dipped in the final slurry prepared for the third coating of Example 1 from the inlet end to the outlet end over 100% of the substrate axial length of the substrate. A pressure pulse was applied on the outlet end to remove the excess slurry and same pressure was then applied to the inlet end to distribute the slurry evenly in the filter walls. The coated substrate was dried at 140° C. for 1 hour and then calcined at 450° C. for 2 hours. The loading of the second coat after calcination was 0.8 g/in³.

The loading of the coating (first coat+second coat) was 2.0 g/in³, including 1.69 g/in³ of Chabazite, 0.17 g/in³ of alumina+silica, 0.085 g/in³ of zirconia, calculated as $ZrO_2$, and 3.5 weight-% of copper, calculated as CuO, based on the weight of Chabazite (0.059 g/in³ of copper, calculated as CuO).

Example 2 Use of the Catalysts of Example 1 and of Comparative Example 1—NOx Conversion and $NH_3$ Storage The NOx conversion at 20 ppm $NH_3$ slip of the aged catalysts of Example 1 and of Comparative Example 1 (hydrothermal ageing at 800° C. for 16 hours) was measured on an engine bench with a 2 liters engine ($V_L$=120-130 m³/h, normalized stoichiometric ratio (NSR) of about 1.5 at 200° C. and of 2 at 600 and 650° C.). The ammonia storage of the aged catalysts of Example 1 and of Comparative Example 1 was also measured at 200° C. The results are displayed on FIGS. 1 and 2, respectively.

As may be taken from FIGS. 1 and 2, the aged catalyst of Example 1 exhibits improved NOx conversion (+7%) at low temperatures, in particular at 200° C., compared to the aged catalyst of Comparative Example 1 not according to the invention. The aged catalyst of Example 1 exhibits improved ammonia storage capacity at 200° C. compared to the aged catalyst of Comparative Example 1. Further, the aged catalyst of Example 1 maintains good NOx conversions at high temperatures, namely at 600 and 650° C., comparable to the NOx conversions obtained with the aged catalyst of Comparative Example 1. This example demonstrates that the specific configuration of the catalysts according to the invention permits to improve the NOx conversion at low temperatures while maintaining the same NOx conversion at high temperatures versus the non-zoned catalyst.

Example 3 Selective Catalytic Reduction Catalyst According to the Present Invention (Two Coatings—Loading Ratio Cu(in)/Cu(Out) 0.69:1)

First Coating

A CuO powder having a Dv50 of 33 micrometers was added to water. The amount of CuO was calculated such that the amount of copper after calcination was of 2.75 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the first coating, calculated as $ZrO_2$, was 5 weight-% based on the weight of the Chabazite. Separately, an H form-Chabazite (Dv50 of 1.3 micrometers, a $SiO_2:Al_2O_3$ of 27 and a BET specific surface area of about 761 m$^2$/g) was added to water to form a mixture having a solid content of 38 weight-%. The Chabazite mixture was mixed to the slurry. The amount of the Chabazite was calculated such that the loading of Chabazite was 85.8% of the loading of the first coating after calcination. The resulting slurry was milled using a continuous milling apparatus so that the Dv90 value of the particles was 3.5 micrometers.

Separately, an aqueous slurry having a solid content of 26 weight-% and comprising alumina ($Al_2O_3$ 94 weight-% with $SiO_2$ 6 weight-% having a BET specific surface area of 173 m$^2$/g, a Dv90 of about 5 micrometers) was prepared. The amount of alumina+silica was calculated such that the loading of alumina+silica was 6.4% of the loading of the first coating after calcination. Tartaric acid was added to the aqueous slurry. The amount of tartaric acid was calculated such that it was 0.7 weight-% based on the weight of the Chabazite in the first coating. The resulting slurry and the Cu-Chabazite containing slurry were combined and 1 weight-% of acetic acid, based on the weight of the Chabazite, was added, forming a final slurry. The solid content of the final slurry was adjusted to 34 weight-%.

A porous uncoated wall-flow silicon carbide filter substrate (an average porosity of 63%, a mean pore size of 20 micrometers, 350 cpsi and 0.28 mm wall thickness) was dipped in the final slurry, after a further dilution reducing the solid content of the slurry, from the inlet end to the outlet end over 30% of the substrate axial length of the substrate. A pressure pulse was applied on the outlet end to remove the excess slurry and same pressure was then applied to the inlet end to distribute the slurry evenly in the filter walls. The coated substrate was dried at 140° C. for 1 hour and then calcined at 450° C. for 2 hours. The loading of the coat was of 1.14 g/in$^3$. The coating method was repeated once after another dilution reducing the solid content of the slurry (loading of the further coat was of 0.76 g/in$^3$). The loading of the first coating was about 2.0 g/in$^3$ after calcination, including 1.716 g/in$^3$ of Chabazite, 0.128 g/in$^3$ of alumina+silica, 0.0858 g/in$^3$ of zirconia, calculated as $ZrO_2$, and 2.75 weight-% of copper, calculated as CuO, based on the weight of Chabazite (0.048 g/in$^3$ of copper, calculated as CuO).

Second Coating

A CuO powder having a Dv50 of 33 micrometers was added to water. The amount of CuO was calculated such that the amount of copper after calcination was of 4.0 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-%. An aqueous zirconium acetate solution was added to the CuO-containing mixture forming a slurry. The amount of zirconium acetate was calculated such that the amount of zirconia in the second coating, calculated as $ZrO_2$, was 5 weight-% based on the weight of the Chabazite. Separately, an H form-Chabazite (Dv50 of 1.3 micrometers, a $SiO_2:Al_2O_3$ of 27 and a BET specific surface area of about 761 m$^2$/g) was added to water to form a mixture having a solid content of 38 weight-%. The Chabazite mixture was mixed to the slurry. The amount of the Chabazite was calculated such that the loading of Chabazite was 85.8% of the loading of the second coating after calcination. The resulting slurry was milled using a continuous milling apparatus so that the Dv90 value of the particles was 3.5 micrometers.

Separately, an aqueous slurry having a solid content of 26 weight-% and comprising alumina ($Al_2O_3$ 95 weight-% with $SiO_2$ 5 weight-% having a BET specific surface area of 173 m$^2$/g, a Dv90 of about 5 micrometers) was prepared. The amount of alumina+silica was calculated such that the loading of alumina+silica was 6.5% of the loading of the second coating after calcination. Tartaric acid was added to the aqueous slurry. The amount of tartaric acid was calculated such that it was 0.7 weight-% based on the weight of the Chabazite in the second coating. The resulting slurry and the Cu-Chabazite containing slurry were combined. The solid content of the final slurry was adjusted to 34 weight-%.

The obtained coated porous wall-flow filter substrate was dipped in the final slurry, after a further dilution reducing the solid content of the slurry, from the outlet end to the inlet end over 70% of the substrate axial length of the substrate. A pressure pulse was applied on the outlet end to remove the excess slurry and same pressure was then applied to the inlet end to distribute the slurry evenly in the filter walls. The coated substrate was dried at 140° C. for 1 hour and then calcined at 450° C. for 2 hours. The loading of the coat was of 1.14 g/in$^3$. The coating method was repeated once, after another dilution reducing the solid content of the slurry (loading of the further coat was of 0.76 g/in$^3$). The loading of the second coating was 2.0 g/in$^3$ after calcination, including 1.716 g/in$^3$ of Chabazite, 0.128 g/in$^3$ of alumina+silica, 0.0858 g/in$^3$ of zirconia, calculated as $ZrO_2$, and 4 weight-% of copper, calculated as CuO, based on the weight of Chabazite (0.069 g/in$^3$ of copper, calculated as CuO).

Thus, in the present example, the inlet zone extends over 30% of the substrate axial length from the inlet end to the outlet end and comprises the first coating and the outlet zone extends over 70% of the substrate axial length from the outlet end to the inlet end and comprises the second coating.

The ratio of the loading of copper in the inlet zone, Cu(in), calculated as CuO, relative to the loading of copper in the outlet zone, Cu(out), calculated as CuO, Cu(in):Cu(out), is about 0.69:1.

Example 4 Selective Catalytic Reduction Catalyst According to the Present Invention (Two Coatings—Loading Ratio Cu(in)/Cu(Out) 0.875:1)

First Coating

The first coating of Example 4 was prepared as the first coating of Example 3, except that the amount of copper after calcination, calculated as CuO, was 3.5 weight-% based on the weight of Chabazite. The coating process of Example 3 was repeated except that the porous wall flow filter substrate was dipped in the final slurry from the inlet end to the outlet end over 50% of the substrate axial length of the substrate. The loading of the first coating was about 2.0 g/in$^3$ after calcination, including 1.716 g/in$^3$ of Chabazite, 0.128 g/in$^3$ of alumina+silica, 0.0858 g/in$^3$ of zirconia, calculated as $ZrO_2$, and 3.5 weight-% of copper, calculated as CuO, based on the weight of Chabazite (0.06 g/in$^3$ of copper, calculated as CuO).

Second Coating

The second coating of Example 4 was prepared as the second coating of Example 3. The coating process of Example 3 was repeated except that the porous wall flow filter substrate was dipped in the final slurry from the outlet end to the inlet end over 50% of the substrate axial length of the substrate. The loading of the second coating was about 2.0 g/in$^3$ after calcination, including 1.716 g/in$^3$ of Chabazite, 0.128 g/in$^3$ of alumina+silica, 0.0858 g/in$^3$ of zirconia, calculated as $ZrO_2$, and 4.0 weight-% of copper, calculated as CuO, based on the weight of Chabazite (0.069 g/in$^3$ of copper, calculated as CuO).

Thus, in the present example, the inlet zone extends over 50% of the substrate axial length from the inlet end to the outlet end of the substrate and comprises the first coating and the outlet zone extends over 50% of the substrate axial length from the outlet end to the inlet end of the substrate and comprises the second coating. The ratio of the loading of copper in the inlet zone, Cu(in), calculated as CuO, relative to the loading of copper in the outlet zone, Cu(out), calculated as CuO, Cu(in):Cu(out), is about 0.87:1.

Example 5 Selective Catalytic Reduction Catalyst According to the Present Invention (Two Coatings—Loading Ratio Cu(in)/Cu(Out) 0.73:1)

First Coating

The first coating of Example 5 was prepared as the first coating of Example 3. The coating process of Example 3 was repeated except that the porous wall flow filter substrate was dipped in the final slurry from the inlet end to the outlet end over 50% of the substrate axial length of the substrate. The loading of the first coating was about 2.0 g/in$^3$ after calcination, including 1.716 g/in$^3$ of Chabazite, 0.128 g/in$^3$ of alumina+silica, 0.086 g/in$^3$ of zirconia, calculated as $ZrO_2$, and 2.75 weight-% of copper, calculated as CuO, based on the weight of Chabazite (0.047 g/in$^3$ of copper, calculated as CuO).

Second Coating

The second coating of Example 5 was prepared as the second coating of Example 3 except that amount of CuO was calculated such that the amount of copper after calcination was of 3.75 weight-% based on the weight of the Chabazite. The coating process of Example 3 was repeated except that the porous wall flow filter substrate was dipped in the final slurry from the outlet end to the inlet end over 50% of the substrate axial length of the substrate. The loading of the second coating was about 2.0 g/in$^3$ after calcination, including about 1.716 g/in$^3$ of Chabazite, 0.128 g/in$^3$ of alumina+silica, 0.0858 g/in$^3$ of zirconia, calculated as $ZrO_2$, and 3.75 weight-% of copper, calculated as CuO, based on the weight of Chabazite (0.064 g/in$^3$ of copper, calculated as CuO).

Thus, in the present example, the inlet zone extends over 50% of the substrate axial length from the inlet end to the outlet end of the substrate and comprises the first coating and the outlet zone extends over 50% of the substrate axial length from the outlet end to the inlet end of the substrate and comprises the second coating. The ratio of the loading of copper in the inlet zone, Cu(in), calculated as CuO, relative to the loading of copper in the outlet zone, Cu(out), calculated as CuO, Cu(in):Cu(out), is about 0.73:1.

Comparative Example 2 Selective Catalytic Reduction Catalyst not According to the Invention (No Zoning)

First Coating

The first coating of comparative Example 2 was prepared as the first coating of Example 5 except that the amount of CuO was calculated such that the amount of copper after calcination was of 3.5 weight-%, calculated as CuO, based on the weight of the Chabazite. The loading of the first coating was about 2.0 g/in$^3$ after calcination, including 1.716 g/in$^3$ of Chabazite, 0.128 g/in$^3$ of alumina+silica, 0.086 g/in$^3$ of zirconia, calculated as $ZrO_2$, and 3.5 weight-% of copper, calculated as CuO, based on the weight of Chabazite (0.06 g/in$^3$ of copper, calculated as CuO).

Second Coating

The second coating of comparative Example 2 was prepared as the second coating of Example 5 except that the amount of CuO was calculated such that the amount of copper after calcination was of 3.5 weight-%, calculated as CuO, based on the weight of the Chabazite. The loading of the second coating was about 2.0 g/in$^3$ after calcination, including about 1.716 g/in$^3$ of Chabazite, 0.128 g/in$^3$ of alumina+silica, 0.0858 g/in$^3$ of zirconia, calculated as $ZrO_2$, and 3.5 weight % of copper, calculated as CuO, based on the weight of Chabazite (0.06 g/in$^3$ of copper, calculated as CuO). The first and second coatings had the same composition.

Example 6 Use of the Catalysts of Examples 3 to 5 and of Comparative Example 2

The NOx conversions of the aged catalysts of Examples 3 to 5 at a $NH_3$ Slip of 100 ppm and of Comparative Example 2 (hydrothermal ageing at 800° C. for 16 hours) were measured on an engine bench with a 3 liters engine ($V_L$=128 m$^3$/h at 200° C. and 115 m$^3$/h at 580° C., normalized stoichiometric ratio (NSR) of about 1.5 at 200° C. and of 2 at 580° C.). The results are displayed on Table 1 below.

TABLE 1

| | NOx conversions | |
|---|---|---|
| | NOx conversion (%) | |
| Examples | 200° C. | 580° C. |
| Comparative Example 2 | 35 | 90 |
| Example 3 | 39 | 89 |

TABLE 1-continued

NOx conversions

| Examples | NOx conversion (%) | |
|---|---|---|
| | 200° C. | 580° C. |
| Example 4 | 41 | 88 |
| Example 5 | 37 | 91 |

As may be taken from Table 1, the aged catalysts of Examples 3, 4 and 5 according to the present invention, having a zoned configuration with varying inlet/outlet zone lengths, permitted to obtain an improved NOx conversion at 200° C. compared to the aged catalyst of comparative Example 2 which does not have a zoned configuration while maintaining a high NOx conversion at higher temperatures such as at 580° C.

This example demonstrates that the specific configuration of the selective catalytic reduction catalysts of the present invention permits to improve the NOx conversion at low temperatures at a $NH_3$ slip of 100 ppm while maintaining similar NOx conversion at high temperatures as compared to the comparative example. Finally, this example also demonstrates that this effect is attained also without the presence of a third coating as in the catalyst of Example 1.

Examples 7 and 8 and Comparative Example 3

The selective catalytic reduction catalysts of Examples 7 and 8 were prepared in the same manner as the catalyst of Example 1 except that the amounts of copper outlined in Table 2 below were applied, with the lengths of the coatings as outlined in Table 2. The catalyst of Comparative Example 3 was prepared in the same manner as the catalyst of Example 1 except that the amounts of copper outlined in Table 2 below were applied, with the lengths of the coatings as outlined in Table 2.

TABLE 2

Prepared compositions

| | Coating (bottom) (wt.-%) | First coating (wt.-%) | Length (first coating)* | Second coating (wt.-%) | Length (second coating)* | Cu(in)/Cu(out) (loading ratio) |
|---|---|---|---|---|---|---|
| Example 7 | 3.6 | 3.2 | 70 | 4.1 | 30 | 0.85:1 |
| Example 8 | 3.6 | 3.2 | 30 | 4.1 | 70 | 0.85:1 |
| Comp. Ex 3 | 3.6 | 4.1 | 70 | 3.2 | 30 | 1.18:1 |

*% of the substrate axial length.

Example 9 Use of the Catalysts of Examples 7 and 8 and of Comparative Example 3

The catalysts of Examples 7 and 8 and of Comparative Example 3 were aged for 16 hours at 800° C. (10% $H_2O$, 20% $O_2$, 70% $N_2$). The NOx conversions at 20 ppm $NH_3$ slip obtained with the aged catalysts of Examples 7 and 8 and of Comparative Example 3 were measured on a 2 liters engine at different temperatures, namely at 200, 230, 600 and 650° C. The results are displayed on FIG. 3.

As may be taken from FIG. 3, the NOx conversions at 20 ppm $NH_3$ slip obtained with the catalysts of Examples 7 and 8 were improved, namely of at least +5% at 200° C., compared to the NOx conversion obtained with the catalyst of Comparative Example 3 which has an inversed zoned configuration. The high temperature NOx is similar for all three samples. Further, without wanting to be bound by any theory it could be assumed that this positive effect at low temperature is due to a higher $NH_3$ storage capacity in the particular zoned configuration of the catalysts of the present invention.

This example demonstrates that the specific configuration of the selective catalytic reduction catalysts of the present invention permits to improve the NOx conversion at low temperatures while maintaining high NOx conversion at high temperatures.

Example 10 Selective Catalytic Reduction Catalyst According to the Present Invention (Two Coatings—Loading Ratio Cu(in)/Cu(Out) 0.72:1)

First Coating

The first coating of Example 10 was prepared as the third coating of Example 1 except that the amount of copper was of 3.3 weight-%, calculated as CuO, based on the weight of the Chabazite after calcination and except that the final slurry was coated on a different substrate. In particular, it was coated on a porous uncoated wall-flow filter substrate, silicon carbide, (an average porosity of 60.5%, a mean pore size of 20 micrometers and 350 CPSI and 0.28 mm wall thickness, 58 mm (diameter)*150.5 mm (length)). The coating method was the same as in Example 1 and was repeated once in order to obtain a loading of the first coating of about 1.9 g/in$^3$, including 1.61 g/in$^3$ of Chabazite, 0.16 g/in$^3$ of alumina+silica, 0.08 g/in$^3$ of zirconia, calculated as $ZrO_2$, and 3.3 weight-% of copper, calculated as CuO, based on the weight of the Chabazite (0.053 g/in$^3$ of copper, calculated as CuO).

Second Coating

A CuO powder having a Dv50 of 33 micrometers was added to water. The resulting mixture was milled using a continuous milling apparatus so that the Dv90 value of the particles was 5 micrometers. The resulting slurry had a solid content of 5 weight-%. A powder of alumina+silica ($Al_2O_3$ 94 weight-% with $SiO_2$ 6 weight-% having a BET specific surface area of 173 m$^2$/g, a Dv90 of about 5 micrometers) was added, such that the weight ratio of alumina+silica to CuO in the obtained slurry was 3:1. Further, 0.07 weight-% of tartaric acid, based on the loading of alumina+silica after calcination, 1 weight-% of acetic acid, based on the loading of the second coating after calcination were added obtaining a final slurry.

The obtained coated porous wall-flow filter substrate was dipped in the obtained final slurry from the outlet end to the inlet end over 33% of the substrate axial length of the substrate. The coated substrate was dried at 140° C. for 1 hour and then calcined at 450° C. for 2 hours. The loading of the second coating was 0.084 g/in$^3$ after calcination, including 0.021 g/in$^3$ of CuO, 0.063 g/in$^3$ of alumina+silica.

Thus, in the present example, the inlet zone extends over 67% of the substrate axial length from the inlet end to the outlet end of the substrate and comprises a part of the first coating and the outlet zone extends over 33% of the substrate axial length from the outlet end to the inlet end of the substrate and comprises the second coating and a part of the first coating. The amount of copper, calculated as CuO, was 4.6 weight-% based on the weight of Chabazite in the outlet zone. The ratio of the loading of copper in the inlet zone, Cu(in), calculated as CuO, relative to the loading of copper in the outlet zone, Cu(out), calculated as CuO, Cu(in):Cu (out), is about 0.72:1.

Example 11 Selective Catalytic Reduction Catalyst According to the Present Invention (Two Coatings—Loading Ratio Cu(in)/Cu(Out) 0.6:1)

The selective reduction catalyst of Example 11 was prepared as the selective catalytic reduction catalyst of Example 10 except that the loading of the second coating was 0.141 g/in$^3$ after calcination, including 0.035 g/in$^3$ of CuO, 0.106 g/in$^3$ of alumina+silica.

Thus, in the present example, the inlet zone extends over 67% of the substrate axial length and comprises a part of the first coating and the outlet zone extends over 33% of the substrate axial length and comprises the second coating and a part of the first coating. The amount of copper, calculated as CuO, was 5.5 weight-% based on the weight of Chabazite in the outlet zone. The ratio of the loading of copper in the inlet zone, Cu(in), calculated as CuO, relative to the loading of copper in the outlet zone, Cu(out), calculated as CuO, Cu(in):Cu(out), is about 0.6:1.

Example 12 Selective Catalytic Reduction Catalyst According to the Present Invention (Two Coatings—Loading Ratio Cu(in)/Cu(Out) 0.72:1)

First Coating

The first coating of Example 12 was prepared as the first coating of Example 10.

Second Coating

A CuO powder having a Dv50 of 33 micrometers was added to water. The resulting mixture was milled using a continuous milling apparatus so that the Dv90 value of the particles was 5 micrometers. The obtained slurry had a solid content of 5 weight-%.

The coated porous wall-flow filter substrate was dipped in the obtained slurry from the outlet end to the inlet end over 33% of the substrate axial length of the substrate. The coated substrate was dried at 140° C. for 1 hour and then calcined at 450° C. for 2 hours. The loading of the second coating was 0.021 g/in$^3$ after calcination, including 0.021 g/in$^3$ of CuO. The length of the second coating from the outlet end to the inlet end defines the outlet zone of the coated substrate wherein the amount of copper, calculated as CuO, was 4.6 weight-% based on the weight of Chabazite in the outlet zone.

Thus, in the present example, the inlet zone extends over 67% of the substrate axial length and comprises a part of the first coating and the outlet zone extends over 33% of the substrate axial length and comprises the second coating and a part of the first coating. The ratio of the loading of copper in the inlet zone, Cu(in), calculated as CuO, relative to the loading of copper in the outlet zone, Cu(out), calculated as CuO, Cu(in):Cu(out), is about 0.72:1.

Example 13 Use of the Catalysts of Examples 10 to 12 and of Comparative Example 1

The NOx conversions of the aged catalysts of Examples 10 to 12 and of Comparative Example 1 (hydrothermal ageing at 800° C. for 16 hours) were measured on an engine bench with a MLB 140 kW Euro 6 engine (normalized stoichiometric ratio (NSR) of about 1.5 at 230° C. and of 2 at 580° C.). The results are displayed on FIGS. 4 and 5.

As may be taken from FIG. 4, the NOx conversions at 230° C. at 20 ppm NH$_3$ slip with the catalysts of Examples 10 to 12 were improved, namely of at least +5% compared to the NOx conversion obtained with the catalyst of Comparative Example 1 which does not have a zoned configuration. Further, improved results were also found at higher temperatures. Further, as may be taken in FIG. 5, comparative results are found for the NOx conversion at 650° C. (even a slight improvement with the catalyst of the present invention).

This example demonstrates that the specific zoned configuration of the selective catalytic reduction catalysts of the present invention permits to improve the NOx conversion at low temperature while maintaining high NOx conversion at high temperatures.

CITED LITERATURE

Figure 1:
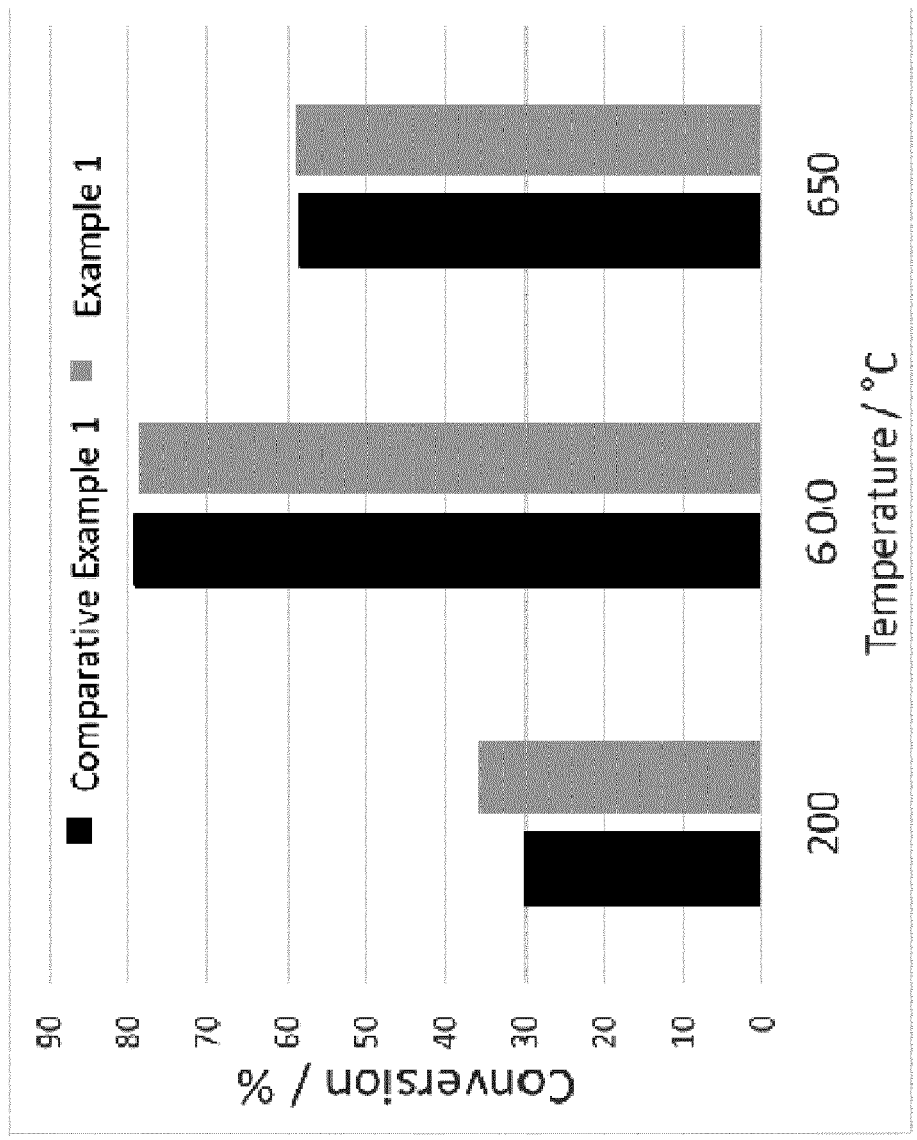
FIG. 1 shows the NOx conversions obtained with the catalysts of Example 1 and of Comparative Example 1 at 200, 600 and 650° C.
Figure 2:
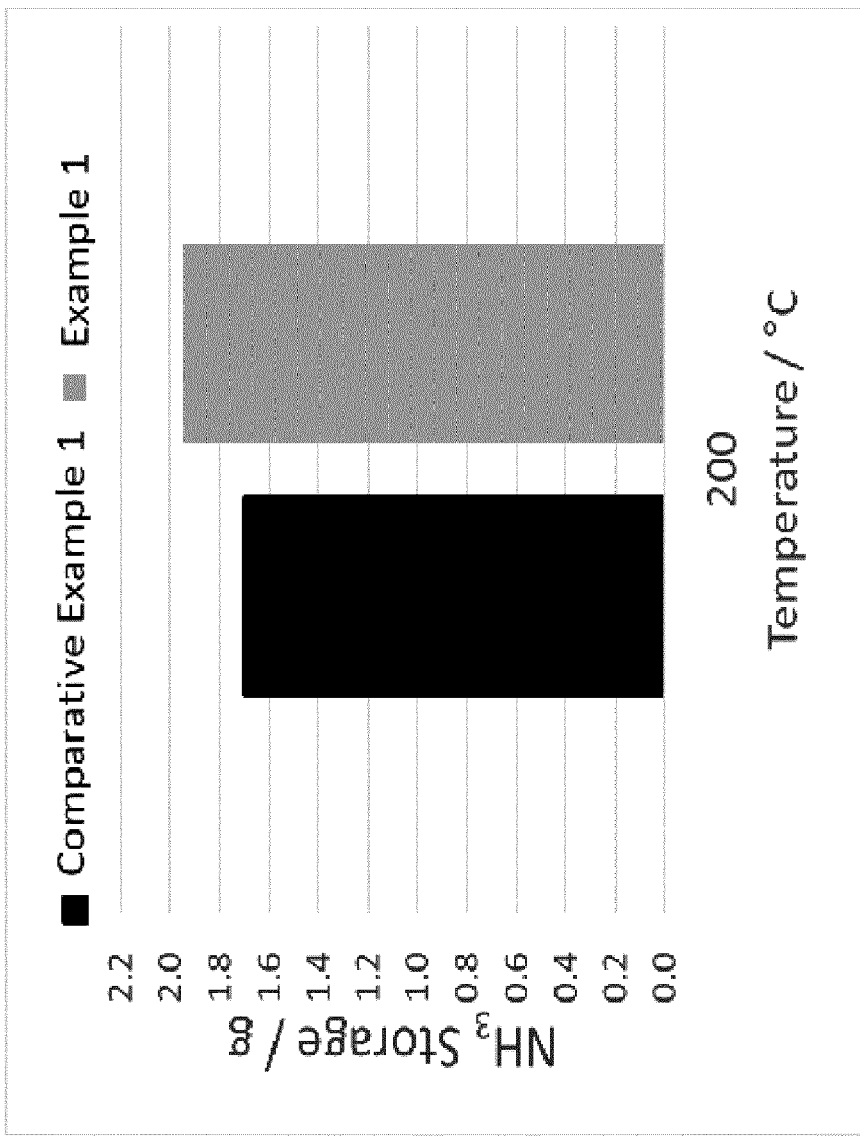
FIG. 2 shows the NH$_3$ storage obtained with the catalysts of Example 1 and of Comparative Example 1 at 200° C.
Figure 3:
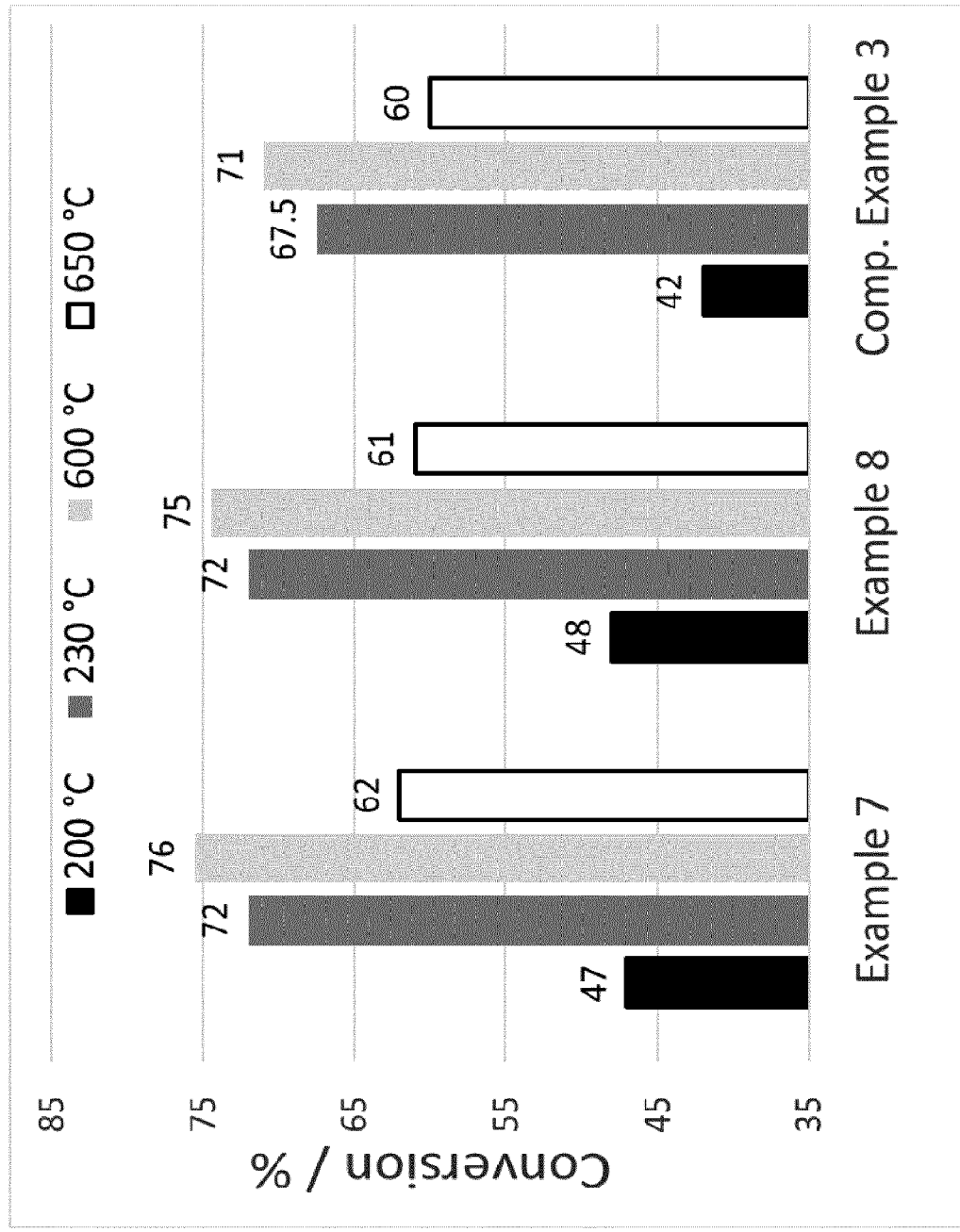
FIG. 3 shows the NOx conversions obtained with the catalysts of Examples 7 and 8 and of Comparative Example 3 at 200, 230, 600 and 650° C.
Figure 4:
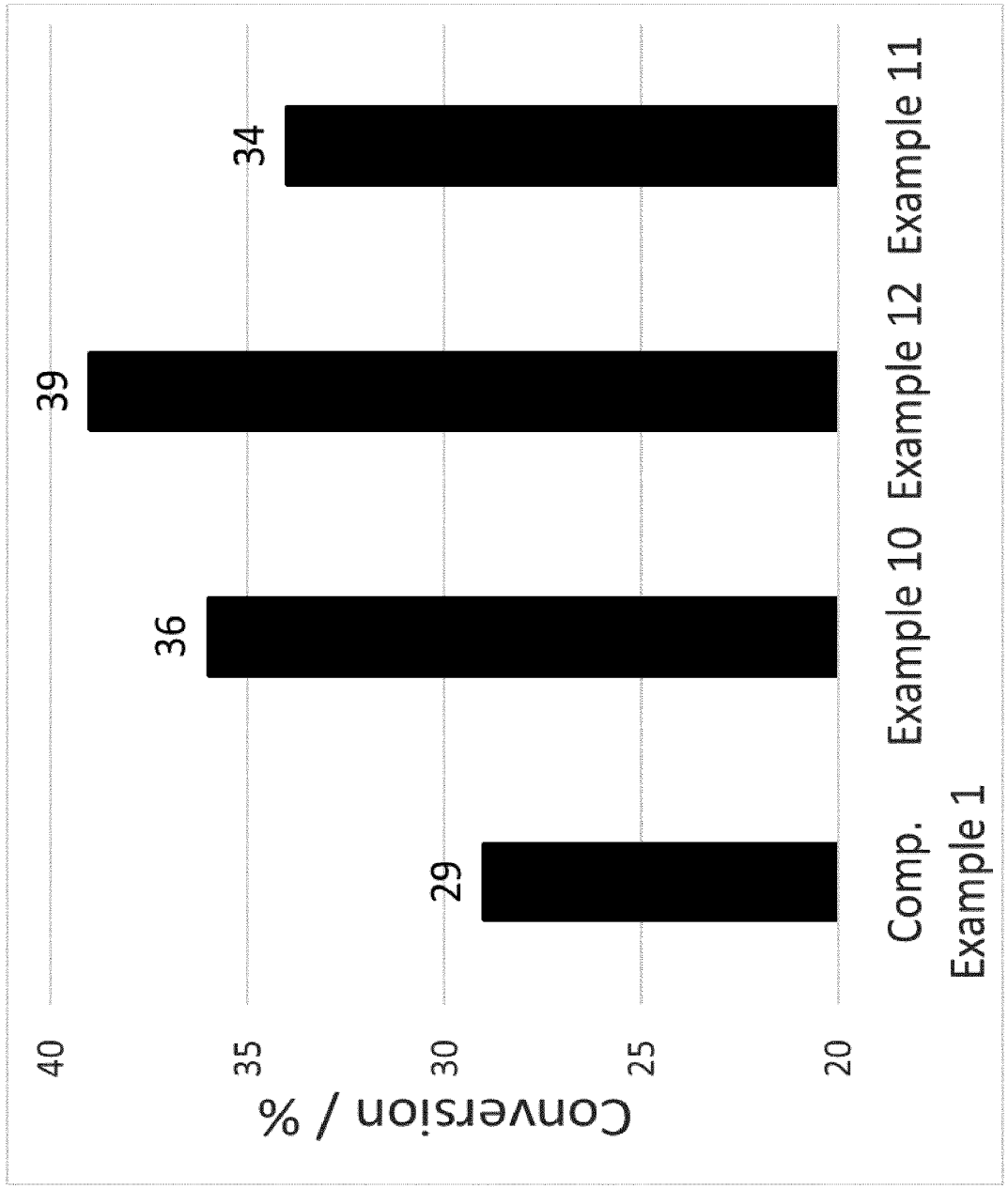
FIG. 4 shows the NOx conversions obtained with the catalysts of Examples 10 to 12 and of Comparative Example 1 at 230° C.
Figure 5:
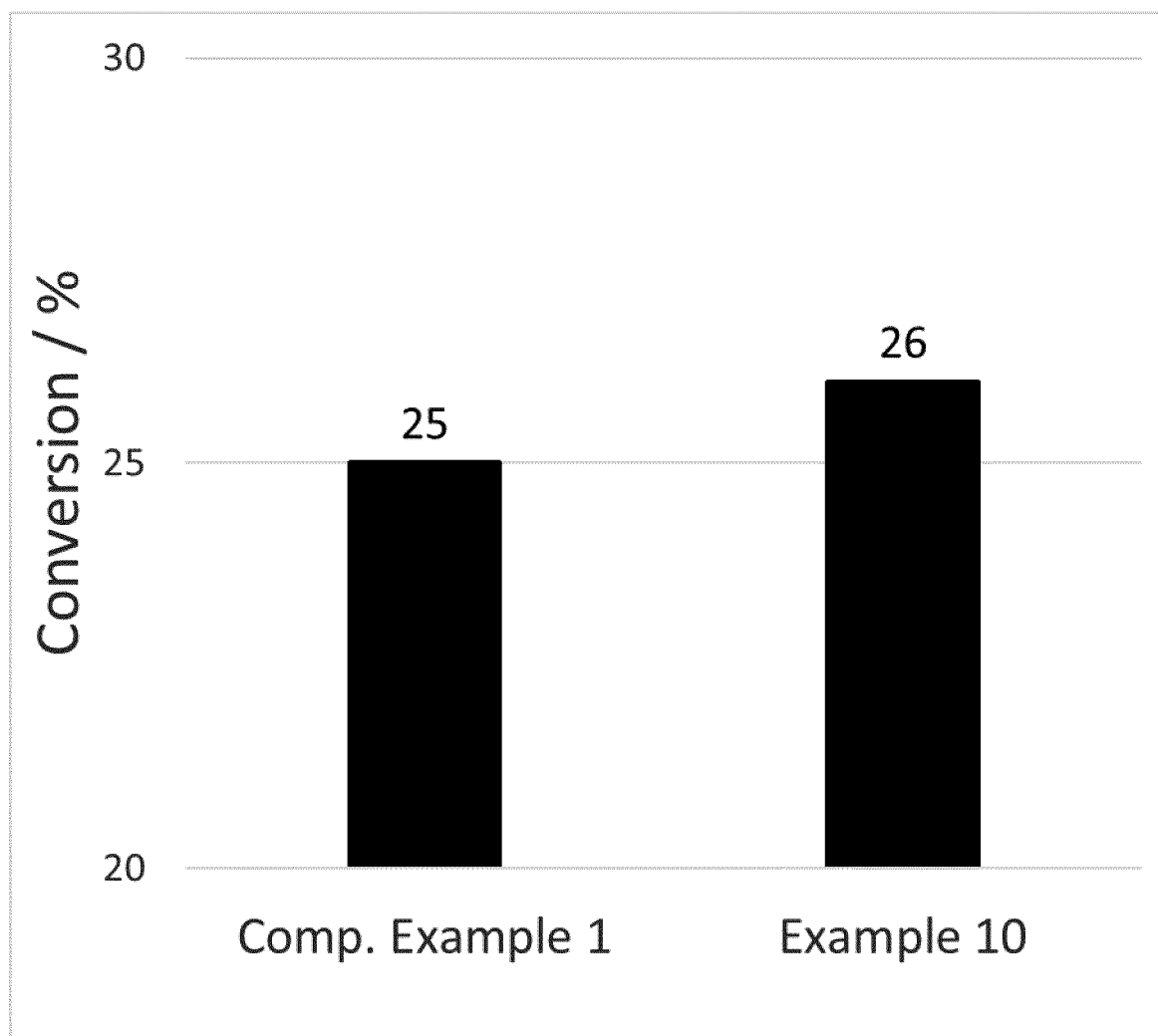
FIG. 5 shows the NOx conversions obtained with the catalysts of Example 10 and of Comparative Example 1 at 650° C.

US 2015/0098870 A1
WO 2017/178576 A1
US 2018/0296979 A1

The invention claimed is:

1. A selective catalytic reduction catalyst for the treatment of an exhaust gas stream of a passive ignition engine, the catalyst comprising:
a porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
wherein the catalyst further comprises a first coating, the first coating extending over x % of the substrate axial length from the inlet end toward the outlet end of the substrate, x ranges from 10 to 100, wherein the first coating comprises copper and an 8-membered ring pore zeolitic material;

wherein the catalyst further comprises a second coating, the second coating extending over y % of the substrate axial length from the outlet end toward the inlet end of the substrate, y ranges from 20 to 90, wherein the second coating comprises copper, and optionally an 8-membered ring pore zeolitic material;

wherein the catalyst optionally further comprises a third coating, at least 90 weight-% of thereof being comprised in the pores of the internal walls, the third coating extending over z % of the substrate axial length, z ranges from 95 to 100, wherein the third coating comprises copper and an 8-membered ring pore zeolitic material;

wherein x+y is at least 90;

wherein y % of w from the outlet end toward the inlet end of the substrate define the outlet zone of the coated substrate and (100−y) % of w from the inlet end toward the outlet end of the substrate define the inlet zone of the coated substrate; and wherein a ratio of the loading of copper in the inlet zone, Cu(in), calculated as CuO, relative to the loading of copper in the outlet zone, Cu(out), calculated as CuO, Cu(in):Cu(out), is less than 1:1.

2. The selective catalytic reduction catalyst of claim 1, wherein there is a gap between the first coating and the second coating, and wherein the gap extends over g % of the substrate axial length, g at most 10, wherein x+y+g=100.

3. The selective catalytic reduction catalyst of claim 1, wherein x+y=100, and wherein there is no gap between the first coating and the second coating.

4. The selective reduction catalyst of claim 1, wherein x ranges from 95 to 100 and wherein y ranges from 20 to 50, wherein x+y>100, or wherein there is an overlap of the first coating and the second coating over q % of the substrate axial length, q at most 50, wherein x+y−q=100.

5. The selective catalytic reduction catalyst of claim 1, wherein the zeolitic material contained in the first coating has a framework type chosen from CHA, AEI, RTH, LEV, DDR, KFI, ERI, AFX, a mixture of two or more thereof and a mixed type of two or more thereof; and wherein from 95 weight-% to 100 weight % of the framework structure of the zeolitic material consists of Si, Al, and O, wherein in the framework structure, the molar ratio of Si to Al, calculated as molar $SiO_2:Al_2O_3$, ranges from 2:1 to 50:1, wherein %, of.

6. The selective catalytic reduction catalyst of claim 1, wherein the first coating further comprises a non-zeolitic oxidic material, wherein the non-zeolitic oxidic material comprises one or more of alumina, titania, silica, zirconia, ceria, and iron oxide; and wherein the first coating comprises the zeolitic material at a loading $(I1)/(g/in^3)$ and the non-zeolitic oxidic material at a loading $(I2)/(g/in^3)$, wherein the ratio of (I1) to (I2), (I1):(I2), ranges from 2:1 to 18:1.

7. The selective catalytic reduction catalyst of claim 1, wherein the first coating comprises copper in an amount, calculated as CuO, ranging from 0.5 weight-% to 7 weight-%, based on the weight of the zeolitic material of the first coating.

8. The selective catalytic reduction catalyst of claim 1, wherein the second coating comprises an 8-membered ring pore zeolitic material, wherein the zeolitic material has a framework type chosen from CHA, AEI, RTH, LEV, DDR, KFI, ERI, AFX, a mixture of two or more thereof and a mixed type of two or more thereof.

9. The selective catalytic reduction catalyst of claim 8, wherein the second coating further comprises a non-zeolitic oxidic material, and wherein the non-zeolitic oxidic material of the second coating comprises one or more of alumina, titania, silica, zirconia, ceria, and iron oxide.

10. The selective catalytic reduction catalyst of claim 8, wherein the second coating comprises copper in an amount, calculated as CuO, ranging from 2.5 weight-% to 15 weight-%, based on the weight of the zeolitic material of the second coating.

11. The selective catalytic reduction catalyst of claim 1, wherein from 98 weight-% to 100 weight % of the second coating consists of CuO.

12. The selective catalytic reduction catalyst of claim 1, wherein the second coating further comprises a non-zeolitic oxidic material, wherein the non-zeolitic oxidic material of the second coating comprises one or more of alumina, titania, silica, zirconia, ceria, and iron oxide; and wherein the weight ratio of the non-zeolitic oxidic material of the second coating to copper comprised in the second coating ranges from 0.1:1 to 5:1.

13. The selective catalytic reduction catalyst of claim 1, wherein the third coating extends over z % of the substrate axial length from the inlet end toward the outlet end or from the outlet end toward the inlet end.

14. The selective catalytic reduction catalyst of claim 13, wherein the zeolitic material of the third coating has a framework type chosen from CHA, AEI, RTH, LEV, DDR, KFI, ERI, AFX, a mixture of two or more thereof and a mixed type of two or more thereof;

wherein the third coating further comprises an oxidic material; and wherein the third coating comprises the oxidic material at a loading ranging from 0.01 $g/in^3$ to 0.4 $g/in^3$.

15. The selective catalytic reduction catalyst of claim 13, wherein the third coating further comprises a non-zeolitic oxidic material, wherein the non-zeolitic oxidic material comprises one or more of alumina, titania, silica, zirconia, ceria, and iron oxide; and wherein the third coating comprises the zeolitic material at a loading $(I1")/(g/in^3)$ and the non-zeolitic oxidic material at a loading $(I2")/(g/in^3)$, wherein the ratio of (I1") to (I2"), (I1"):(I2"), ranges from 2:1 to 18:1.

16. The selective catalytic reduction catalyst of claim 13, wherein the third coating comprises copper in an amount, calculated as CuO, ranging from 0.5 weight-% to 7 weight-%, based on the weight of the zeolitic material of the third coating.

17. The selective catalytic reduction catalyst of claim 1, wherein the ratio of the loading of copper in the inlet zone, Cu(in), calculated as CuO, relative to the loading of copper in the outlet zone, Cu(out), calculated as CuO, Cu(in):Cu(out), ranges from 0.30:1 to 0.95:1.

18. The selective catalytic reduction catalyst of claim 1, wherein the ratio of the loading of the zeolitic material in the outlet zone, $I(out)/(g/in^3)$, relative to the loading of the zeolitic material in the inlet zone, $I(in)/(g/in^3)$, I(out)/I(in), ranges from 0.9:1 to 1.1:1.

19. A process for preparing the selective catalytic reduction catalyst, comprising (a) providing an uncoated porous wall-flow filter substrate comprising an inlet end, an outlet end, a substrate axial length w extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

(b) optionally providing an aqueous mixture comprising water, a source of copper and an 8-membered ring pore zeolitic material, disposing the mixture on the substrate provided in (a), over z % of the substrate axial length, with z ranging from 95 to 100, calcining the substrate comprising the mixture disposed thereon, obtaining the substrate comprising a third coating, wherein at least 90 weight-% of the coating are comprised in the pores of the internal walls of the substrate;

(c) providing an aqueous mixture comprising water, a source of copper and an 8-membered ring pore zeolitic material, disposing the mixture on the substrate provided in (a), or on the substrate comprising a third coating obtained in (b), over x % of the substrate axial length from the inlet end toward the outlet end of the substrate, with x ranging from 10 to 100, calcining the substrate comprising the mixture disposed thereon, obtaining the substrate comprising a first coating, and optionally a third coating;

(d) providing an aqueous mixture comprising water, a source of copper, and optionally an 8-membered ring pore zeolitic material, disposing the mixture on the substrate provided in (c), over y % of the substrate axial length from the outlet end toward the inlet end of the substrate, with y ranging from 20 to 90, calcining the substrate comprising the mixture disposed thereon, obtaining the substrate comprising a first coating, a second coating, and optionally a third coating;

wherein x+y is at least 90;

wherein y % of w from the outlet end toward the inlet end of the substrate define the outlet zone of the coated substrate and (100−y) % of w from the inlet end toward the outlet end of the substrate define the inlet zone of the coated substrate;

wherein the ratio of the loading of copper in the inlet zone, Cu(in), calculated as CuO, relative to the loading of copper in the outlet zone, Cu(out), calculated as CuO, Cu(in):Cu(out), is less than 1:1.

20. An exhaust gas treatment system for treating an exhaust gas stream exiting a passive ignition engine, the exhaust gas treatment system having an upstream end for introducing the exhaust gas stream into the exhaust gas treatment system, wherein the exhaust gas treatment system comprises a selective catalytic reduction catalyst according to claim 1, and one or more of a diesel oxidation catalyst, a selective catalytic reduction catalyst, an ammonia oxidation catalyst, a NOx trap, and a particulate filter.

* * * * *